United States Patent
Etou

(10) Patent No.: US 6,904,990 B2
(45) Date of Patent: Jun. 14, 2005

(54) FRAME ASSEMBLY FOR SNOWMOBILE

(75) Inventor: Toyochika Etou, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/213,747

(22) Filed: Aug. 6, 2002

(65) Prior Publication Data
US 2003/0029663 A1 Feb. 13, 2003

(30) Foreign Application Priority Data
Aug. 9, 2001 (JP) ......................... 2001-241610

(51) Int. Cl.$^7$ ................... B60K 13/04; B60K 17/22; B62D 21/00; B62M 27/02
(52) U.S. Cl. ................. 180/190; 180/296; 180/376; 180/312; 280/781
(58) Field of Search ................. 180/182, 186, 180/190, 311, 312, 296, 376; 280/781

(56) References Cited

U.S. PATENT DOCUMENTS

| | | | | |
|---|---|---|---|---|
| 3,871,460 A | * | 3/1975 | Dehnert ..................... | 180/190 |
| 4,620,604 A | * | 11/1986 | Talbot ........................ | 180/190 |
| 5,174,258 A | * | 12/1992 | Tanaka ..................... | 123/198 E |
| 5,660,245 A | * | 8/1997 | Marier et al. ............... | 180/190 |
| 5,857,385 A | | 1/1999 | Takeuchi .................... | 74/489 |
| 5,862,662 A | | 1/1999 | Fukuda et al. ............... | 60/313 |
| 5,944,133 A | | 8/1999 | Eto ............................ | 180/190 |
| 5,957,230 A | | 9/1999 | Harano et al. ............. | 180/68.4 |
| 5,992,552 A | | 11/1999 | Eto ............................ | 180/190 |
| 6,009,966 A | * | 1/2000 | Olson et al. ................ | 180/182 |
| 6,125,958 A | * | 10/2000 | Olson et al. ................ | 180/182 |
| 6,328,124 B1 | * | 12/2001 | Olson et al. ................ | 180/182 |
| 6,655,487 B2 | * | 12/2003 | Mallette et al. ............ | 180/190 |
| 2001/0040064 A1 | * | 11/2001 | Girouard et al. ........... | 180/183 |

FOREIGN PATENT DOCUMENTS

| | | | | |
|---|---|---|---|---|
| JP | 03157283 | * | 7/1991 | .......... B62K/25/26 |
| JP | 9-193880 | | 7/1997 | |

* cited by examiner

Primary Examiner—Ruth Ilan
Assistant Examiner—Laura B. Rosenberg
(74) Attorney, Agent, or Firm—Knobbe, Martens, Olson & Bear, LLP

(57) ABSTRACT

A snowmobile has a frame assembly. A drive assembly depends from the frame assembly and abuts the terrain. An engine powers the drive assembly. The engine includes an output shaft. A transmissOn assembly transfers power of the engine to the drive assembly. The transmission assembly includes a transfer shaft driven by the output shaft. The frame assembly has a frame member disposed rearward of the engine. The frame member unitarily forms side sections, a rear section and a bottom section. The transfer shaft transversely extends between the side sections and is journaled by the side sections. The frame member supports the engine in front of the transfer shaft.

16 Claims, 19 Drawing Sheets

FRAME ASSEMBLY FOR SNOWMOBILE

RELATED APPLICATIONS

This application is based upon and claims priority to Japanese Patent Application No. 2001-241610, filed on Aug. 9, 2001, which is hereby incorporated by reference in its entirety.

BACKGROUND OF THE INVENTION

1. Field of the Invention

The present invention generally relates to a frame assembly for a snowmobile, and more particularly to an improved frame assembly for an engine compartment of a snowmobile.

2. Description of the Related Art

A typical snowmobile includes a frame assembly, a drive assembly including an endless drive belt that engages the terrain for propelling the snowmobile along the terrain, and a slide rail unit that supports the drive belt. The frame assembly carries an engine which powers the drive belt through a suitable transmission assembly. Typically, a pair of front skis depends from the frame assembly for steering the snowmobile. A steering handle extends to the rider's area from the frame assembly so that the rider can operate the steering handle. A steering linkage couples the skis with the steering handle.

The transmission assembly conveys the engine power to the drive assembly. The engine typically includes an output shaft. The transmission assembly can include a transfer shaft journaled on the frame assembly. The output shaft can drive the transfer shaft through a continuously variable transmission mechanism such as a v-belt transmission formed with a drive pulley, driven pulley and a v-belt. The drive pulley can be affixed onto the output shaft, while the driven pulley can be affixed onto the transfer shaft. The v-belt is wound around the drive and driven pulleys.

SUMMARY OF THE INVENTION

One aspect of the present invention includes the realization that certain mechanical difficulties with snowmobiles are the result of small fluctuations or irregularities in support portions of the frame of the snowmobile. For example, many conventional snowmobiles include engine compartments formed of numerous pieces of sheet and structural metal welded or riveted to a main frame assembly. This method of manufacturing the engine compartment of a snowmobile, however, yields irregularities in the dimensions of certain portions of the engine compartment. For example, certain portions of the engine compartment contain supports for components of the transmission of a snowmobile, which typically includes a continuously variable transmission. These types of transmissions are adversely effected by variations in the spacing and arrangement of the components, such as, for example, but without limitation, shaft spacing. Thus, it has been found that snowmobile engine compartments that are manufactured from a plurality of structural and/or sheet metal welded or riveted together yield dimensional variations that adversely effect the performance of the snowmobile transmission.

In accordance with another aspect of the present invention, a snowmobile comprises a frame assembly. A drive assembly depends from the frame assembly and is adapted to abut the terrain so as to propel the frame assembly along the terrain. An internal combustion engine is configured to power the drive assembly. The engine includes an output shaft. A transmission assembly is configured to transfer power of the engine to the drive assembly. The transmission assembly includes a transfer shaft driven by the output shaft. The frame assembly comprises a frame member disposed rearward of the engine. The frame member monolithically defining side sections, a rear section and a bottom section. The transfer shaft transversely extends between the side sections and journaled by the side sections. The frame member supports the engine in front of the transfer shaft.

BRIEF DESCRIPTION OF THE DRAWINGS

These and other features, aspects, and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise 20 figures.

DETAILED DESCRIPTION OF THE PREFERRED EMBODIMENT

With particular reference to FIGS. 1–3, 11 and 12, an overall construction of a snowmobile 20 including certain features, aspects and advantages of the present invention is described below.

Figure 1:
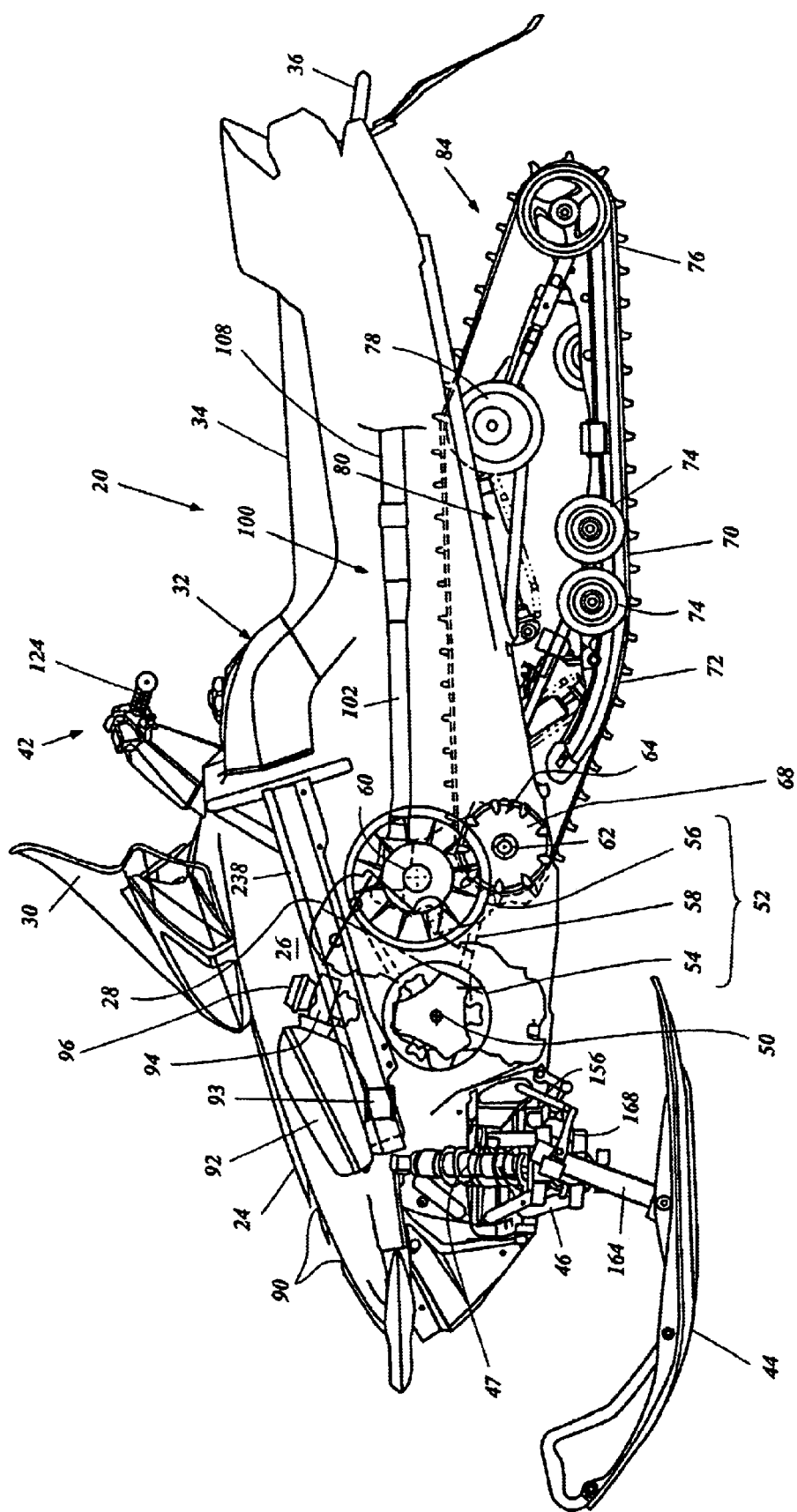
FIG. 1 is a side elevational view of a snowmobile having a frame assembly arranged and configured in accordance with certain features, aspects and advantages of the present invention. Certain portions are illustrated as being broken away and other internal portions are shown in hidden line.

The snowmobile 20 generally comprises a frame assembly 22 (FIG. 2) that carries a number of other components of the snowmobile 20. The frame assembly 22 is described in greater detail below. A forward body cover 24 is disposed over a forward portion of the frame assembly 22. As illustrated in FIG. 1, the forward body cover 24 covers, in part, an engine compartment 26 in which an engine 28 is mounted. The engine 28 preferably is an in-line four-cylinder, water-cooled, four-cycle engine and will be described in greater detail below.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to appear to blend together for aesthetic and other reasons.

Rearward of the fuel tank 32, a seat 34 is mounted to the frame assembly 22. Rearward of the seat 34 is positioned a grab bar 36 that can be used to raise a rear portion of the snowmobile 20 for turning and maneuvering when the snowmobile 20 is not being ridden.

Figure 14:
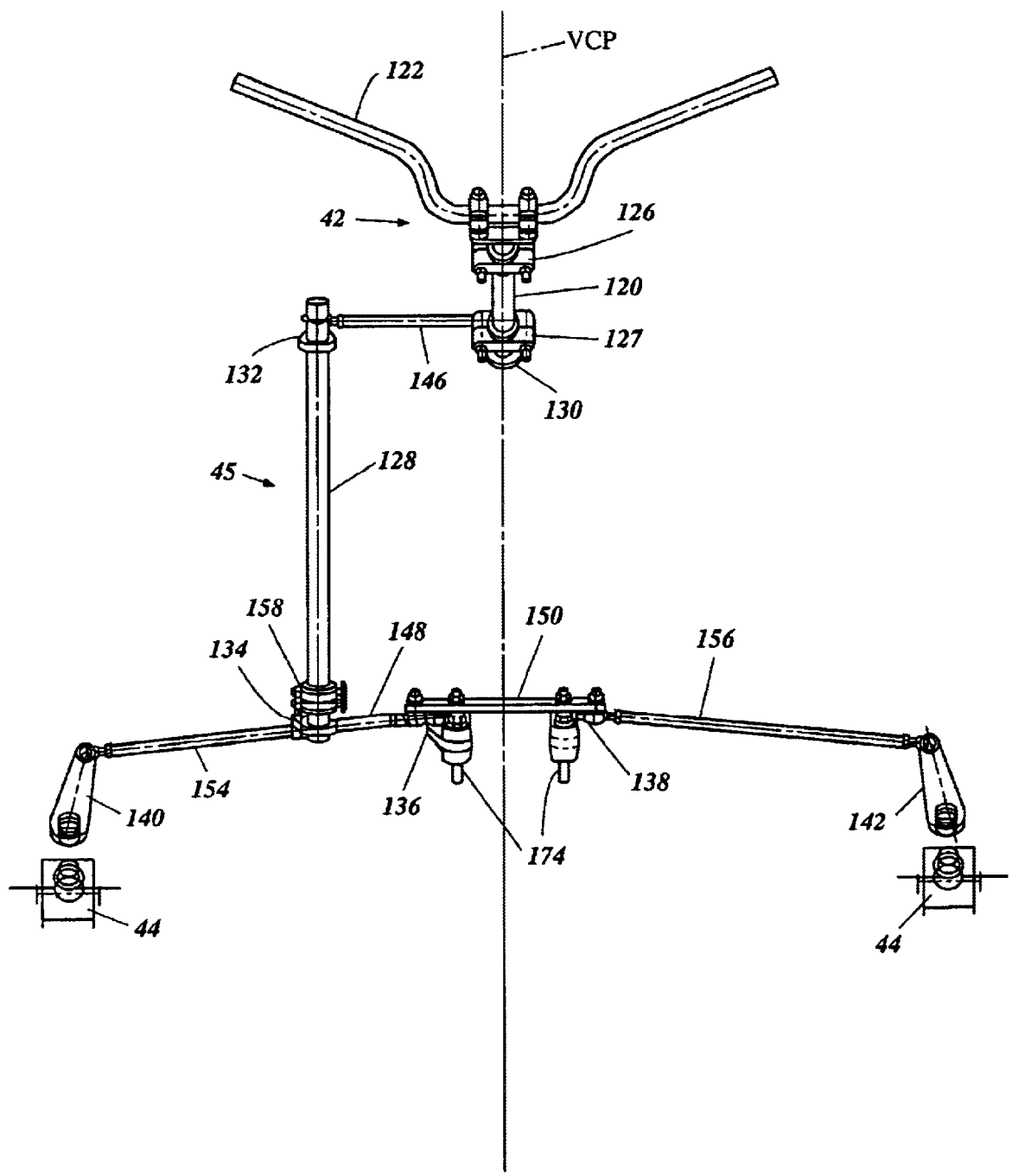
FIG. 14 is a front elevational view of a steering system of the snowmobile. Some portions are schematically illustrated.
Figure 15:
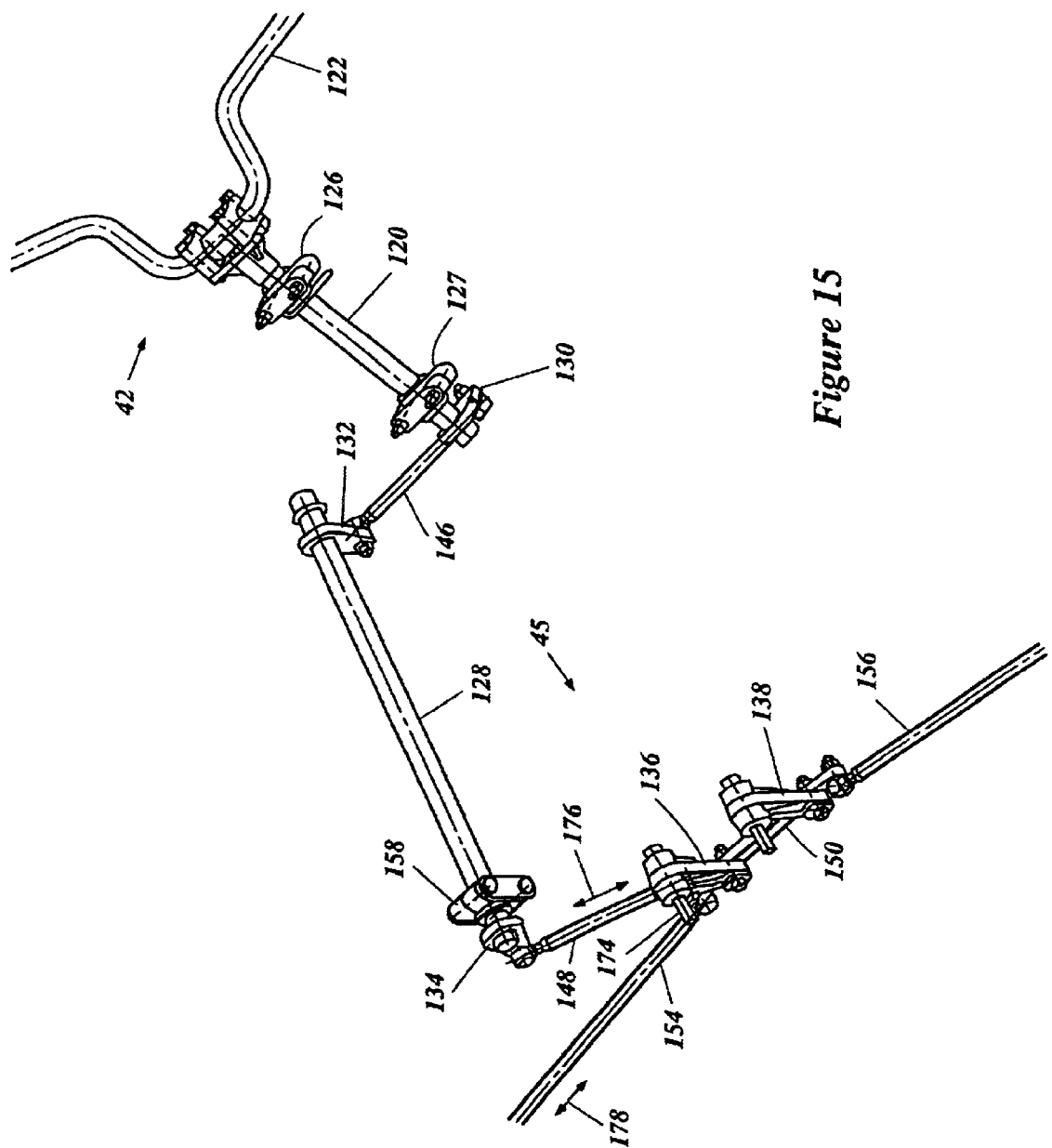
FIG. 15 is a partial perspective view of the steering system of FIG. 14.

Forward of the seat 34 and the fuel tank 32 is a steering handle assembly 42. The steering handle assembly 42 can carry appropriate controls and can be coupled to a pair of front skis 44 by a steering linkage 45 (FIGS. 14 and 15). The steering handle assembly 42 and the steering linkage 45 are described in greater detail below with reference to FIGS. 14 and 15. As the handle assembly 42 is turned, the skis 44 pivot clockwise and counterclockwise about an attachment location. As the skis 44 pivot, the direction of the snowmobile 20 can be altered. The skis 44 are mounted to the frame assembly 22 though a pair of swing units 46. A pair of suspension assemblies 47 also is provided between the frame assembly 22 and the skis 44. Each suspension assembly 47 preferably comprises a shock absorber unit (for example, a cylinder type) and a coil spring to absorb shocks and vibrations generated during travel over rough terrain, although any other construction can be applied.

Figure 3:
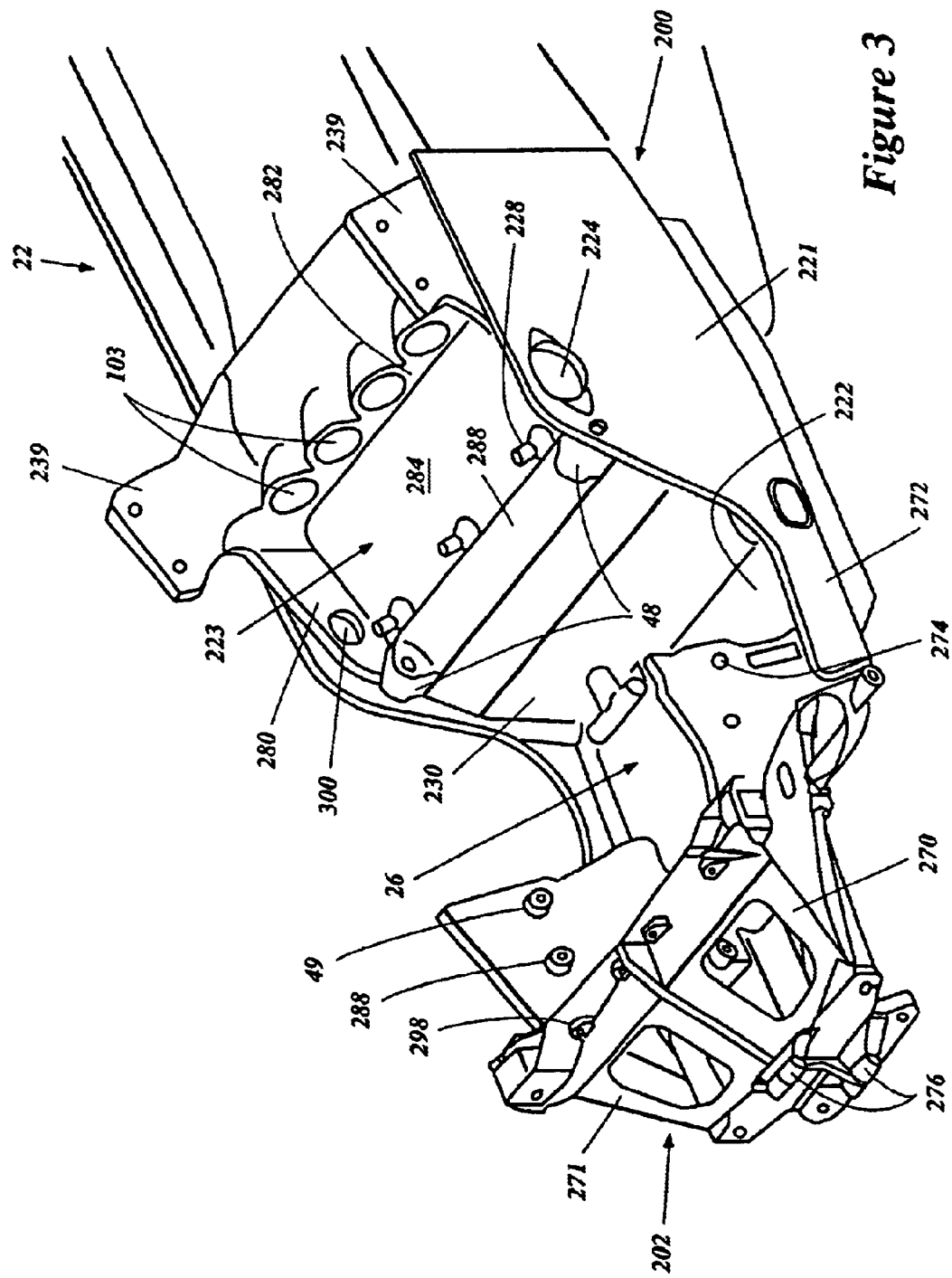
FIG. 3 is a partial perspective view of the frame assembly with the depending components and reinforcement wholly removed.

The engine 28 is mounted onto the frame assembly 22 in any suitable manner. As illustrated in FIG. 3, a set of mount bosses 48, 49 can be used to secure the engine 28 to the frame assembly 22. The illustrated engine 28 has resilient engine bosses cooperating with the mount bosses 48, 49. Alternatively, the mount bosses 48, 49 can be resilient. By mounting the engine 28 with the resilient mounts, vibrations caused by operation of the engine 28 are reduced or eliminated before transmission through the frame assembly 22 to the rider. The engine mount arrangement is described in greater detail below with reference to FIGS. 9 and 10.

With reference to FIG. 1, the engine 28 in the illustrated arrangement is inclined rearwardly relative to vertical, and is mounted transversely within the engine compartment 26. Cylinders of the engine 28 extend side-by-side across a width of the snowmobile 20. In some arrangements, engines having differing numbers of cylinders, different cylinder configurations (e.g., V, W, opposing, etc.), different orientations (e.g., vertical) and different operating principles (e.g., two-stroke diesel, rotary, etc.) can be used.

The engine 28 also comprises a crankshaft (not shown) that extends transversely and an output shaft 50 that extends parallel to the crankshaft and is driven by the crankshaft. The output shaft 50 drives a transmission, which is a continuously variable transmission 52 in the illustrated arrangement. Other transmissions also can be used.

In the illustrated arrangement, the transmission 52 comprises a drive pulley 54, a driven pulley 56 and a v-belt 58. The output shaft 50 rotates the drive pulley 54. The output shaft 50 and the drive pulley 54 can be connected together through a clutch, a centrifugal clutch, a sprag clutch, or they can be directly connected together. The drive pulley 54 powers the driven pulley 56 with the v-belt 58 in the illustrated arrangement. In some configurations, a drive chain can be used in place of the v-belt 58. Other arrangements also can be used. The v-belt transmission 52 is described in greater detail below with reference to FIG. 20.

Figure 16:
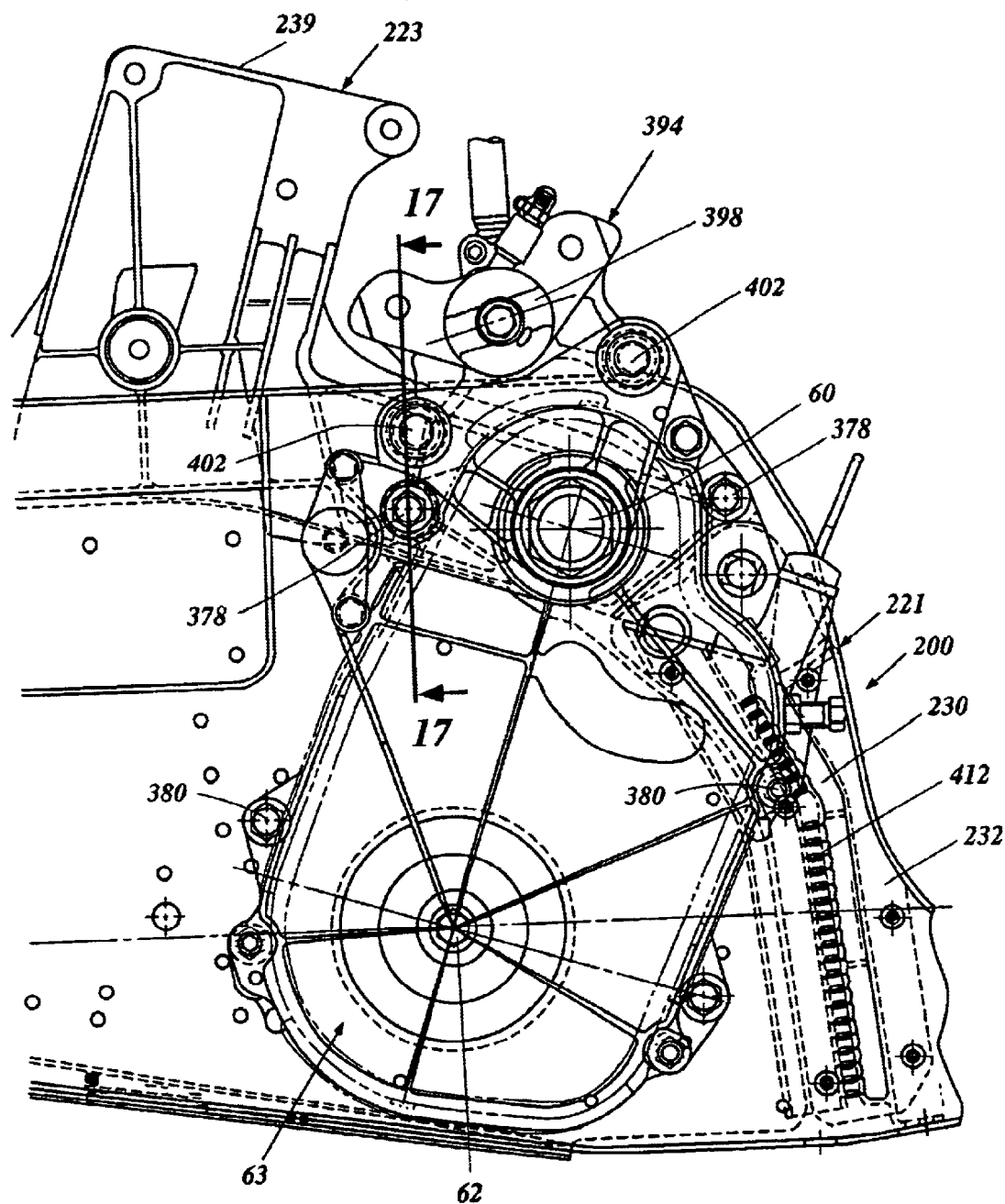
FIG. 16 is a side elevational view of the frame assembly and a chain housing defined aside the frame assembly.
Figure 17:
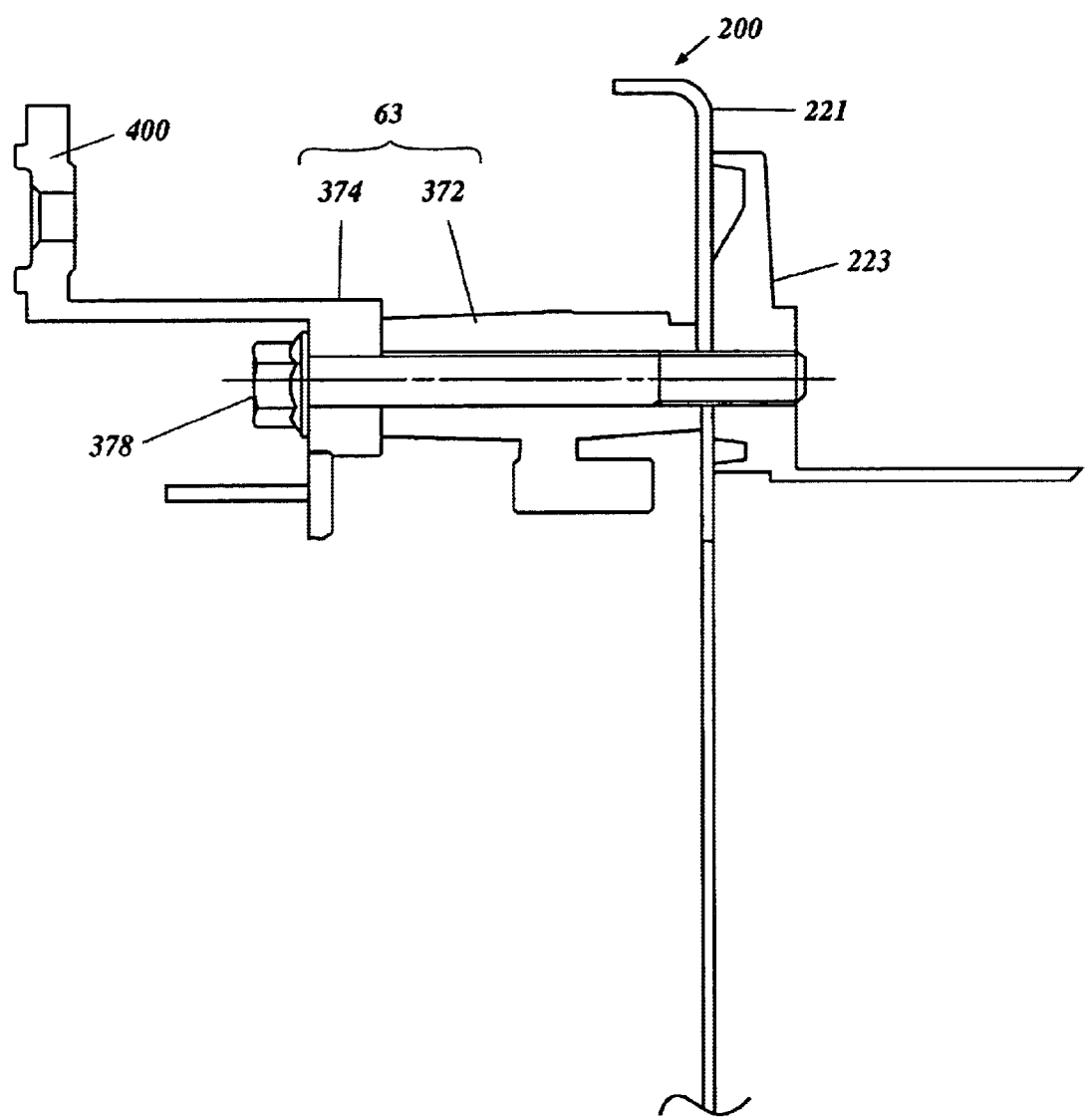
FIG. 17 is a cross-sectional view of the chain housing and a portion of the frame assembly taken along the line 17—17 of FIG. 16.
Figure 18:
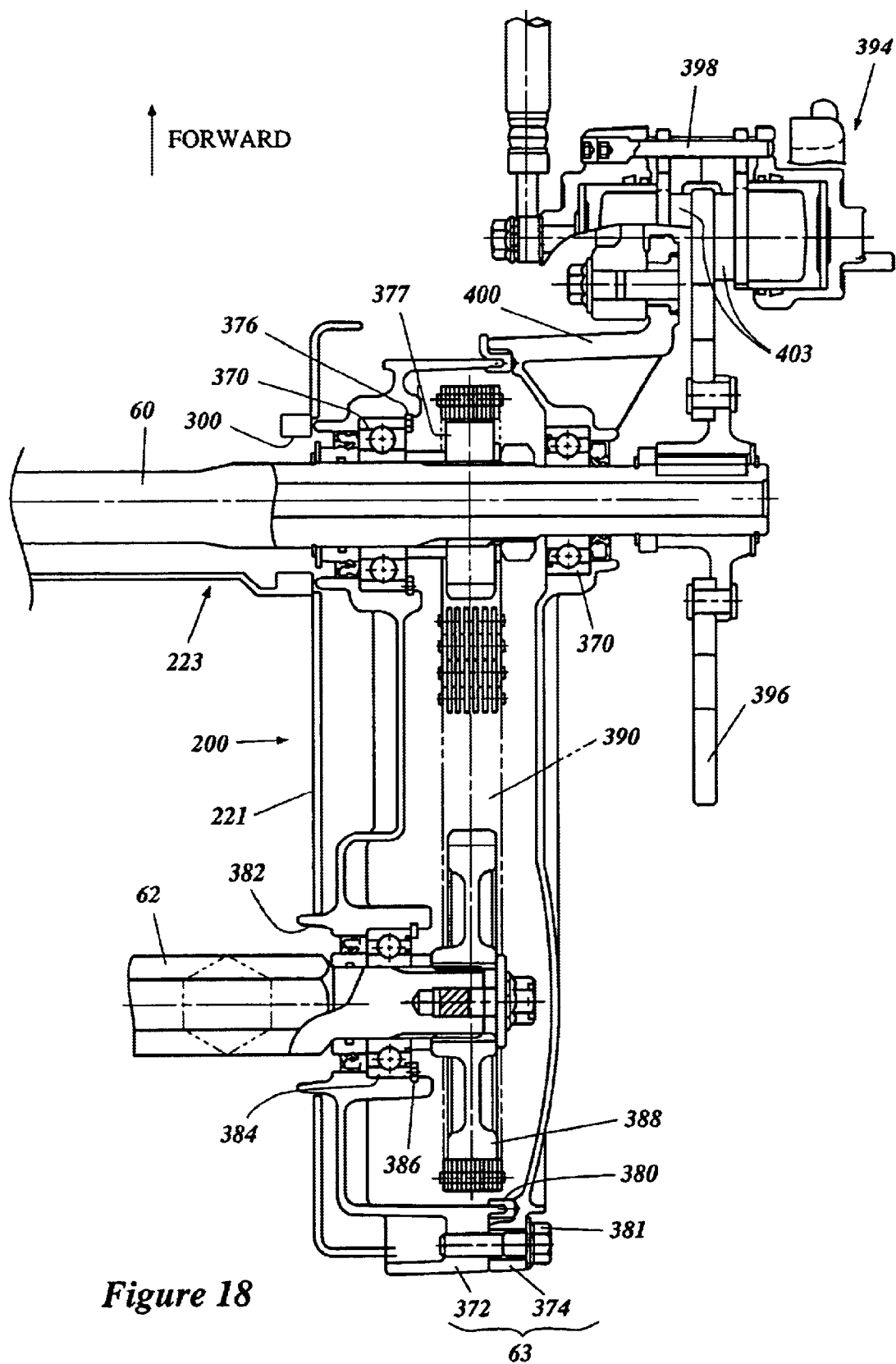
FIG. 18 is a partial sectional and top plan view of the chain housing. The portion of the frame assembly also is shown.

The driven pulley 56 is connected to and rotates about a transfer shaft 60. In the illustrated arrangement, the transfer shaft 60 carries a sprocket 377 (FIG. 18) at the end opposite to the driven pulley 56. The sprocket 377 is connected to a further sprocket 388 (FIG. 18) that is carried by a drive shaft 62. The sprockets 377, 388 are connected together by a chain in one arrangement and these three components are disposed within a chain housing 63 (FIGS. 16–18). The chain housing 63 and an inside construction of the chain housing 63 is described in greater detail below with reference to FIGS. 16–18.

The drive shaft 62 powers a drive unit 64. The drive unit 64 generally comprises a plurality of drive wheels 68. The illustrated drive unit 64 comprises four drive wheels 68. The drive wheels 68 provide a motive force to a drive belt 70, which is commonly used in the snowmobile industry. A lower surface of the drive belt 70 abuts the terrain.

The drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly 22 with a rear suspension system 80. Any suitable rear suspension system 80 can be used and certain portions of the rear suspension system 80 have been schematically illustrated in the illustrated arrangement.

The drive belt 70, the slide rails 72, the suspension wheels 74, the main rear suspension wheels 76, the idle roller 78 and the rear suspension system 80 generally form a drive assembly 84 in the illustrated embodiment.

With continued reference to FIG. 1, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in a suitable manner. An inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28. The charge formers 96 preferably correspond to each cylinder. In some arrangements, a single charge former can be used upstream of a separation point for runners extending to individual cylinders. In addition, in the illustrated arrangement, the engine 28 is carbureted. In some arrangements, the charge formers 96 can be fuel injectors that are mounted for direct injection, indirect injection, or port injection.

The air-fuel charge provided in this manner is combusted within the engine in a suitable manner. The combustion byproducts then are exhausted through a suitable exhaust system 100. In the illustrated arrangement, the exhaust system 100 extends directly rearward from the engine 28. In this manner, an exhaust runner 102 that extends rearward from the engine 28 can be tuned to the engine 28 for improved engine performance. Additionally, the length of each runner 102 can be lengthened prior to merging together with any other runners such that pulse effects on adjoining cylinders can be reduced. The exhaust runners 102 correspond to each cylinder and extend generally rearward from the engine 28. Each exhaust runner 102 is coupled to the engine 28 through openings 103 (FIGS. 3, 4 and 6) of the frame assembly 22 and a heat insulating cover 106 in the illustrated arrangement. The heat insulating cover 106 is described in greater detail below with reference to FIGS. 2, 7 and 8. In some arrangements, a single manifold can be used.

With continued reference to FIG. 1, the runners 102 preferably are joined to merge into manifold pipes 108. The manifold pipes 108 extend rearwardly to a silencer box (not shown). The silencer box provides an enlarged volume into which the exhaust can flow. Exhaust energy is dissipated within the silencer box and the noise level of the exhaust can be decreased. The silencer box preferably is disposed rearward of the seat 34. A pair of exhaust pipes (not shown) preferably extends rearward from the silencer box. In some arrangements, a single exhaust pipe can extend from the silencer box. One end of the exhaust pipes preferably defines an ultimate exhaust discharge from the snowmobile 20 such that the exhaust gases are discharged into the atmosphere.

With reference to FIGS. 14 and 15, the steering handle assembly 42 and the steering linkage 45 are described in greater detail below.

Figure 2:
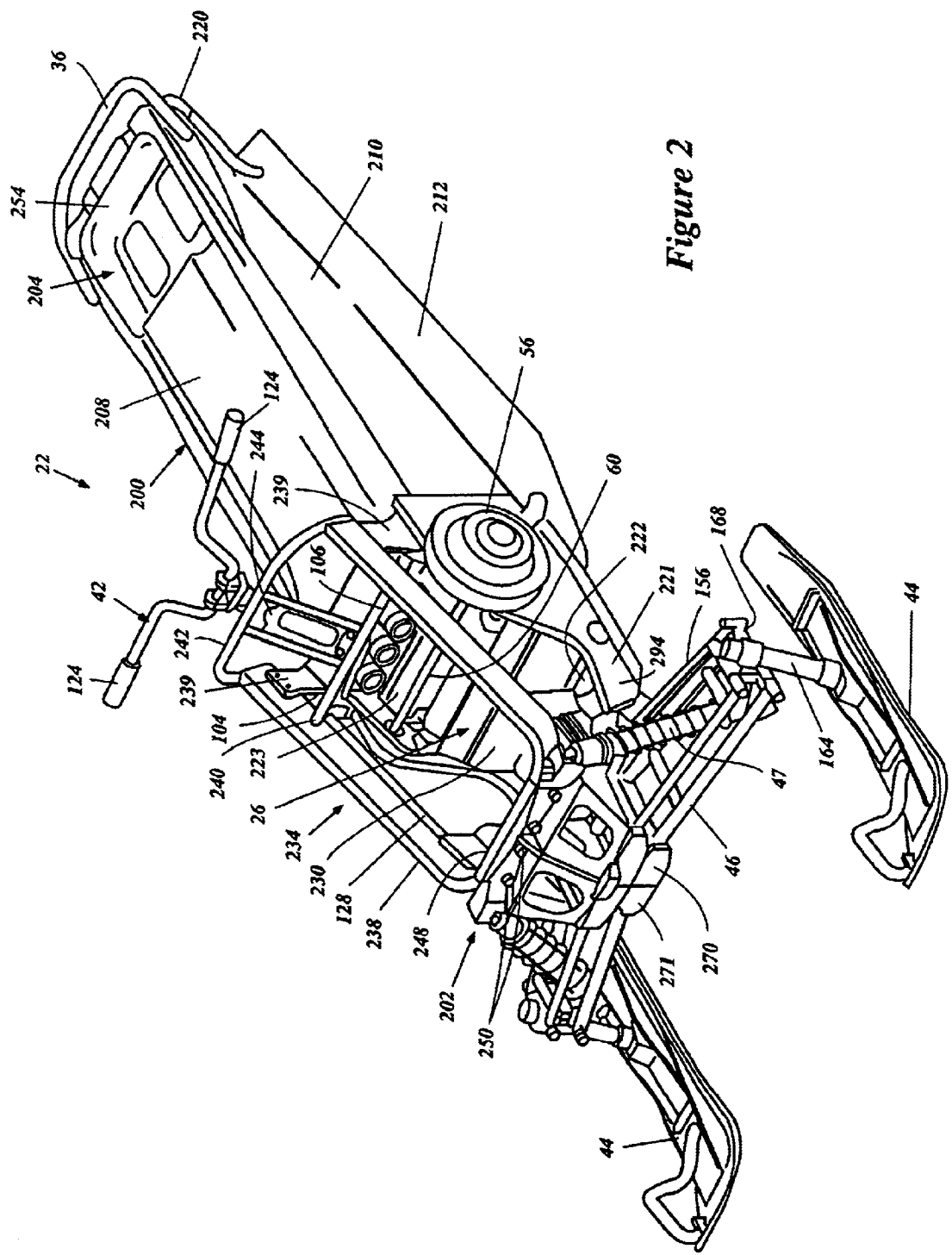
FIG. 2 is a perspective view of the frame assembly and depending components

The illustrated steering handle assembly 42 preferably comprises a steering shaft 120, a handle bar 122 and a pair of grips 124 (FIGS. 1 and 2). The steering shaft 120 extends generally vertically with a top portion thereof inclining slightly rearwardly. The frame assembly 22 supports the steering shaft 120 with support members 126, 127 in a manner that provides for pivotal movement of the steering shaft 120 about a steering axis.

The steering linkage 45 preferably comprises a steering column 128, lever arms 130, 132, 134, 136, 138, 140, 142, link rods 146, 148, a connecting link 150 and steering rods 154, 156.

The steering shaft 120 is coupled with the lever arm 130. The lever arm 130 is connected to the lever arm 132 affixed to a top portion of the steering column 128 through the link rod 146. The frame assembly 22 supports the steering column 128 with a support member 158 in a manner that provides for pivotal movement of the steering column 128 about a steering axis. The lever arm 134 is affixed to a bottom portion of the steering column 128 and is connected to the lever arm 136 through the link rod 148. The connecting link 150 connects the lever arm 136 with the lever arm 138. The steering rods 154, 156 extend transversely from both ends of the connecting link 150. The lever arms 140, 142 are coupled with the respective outer ends of the steering rods 154, 156 on each one end and also are coupled with the skis 44 on each another end.

The illustrated steering handle assembly 42 and the steering linkage 45 are arranged generally symmetrical relative to a vertical center plane VCP which extends vertically and fore to aft in a center of the snowmobile 20 when the snowmobile 20 is laid on a horizontal plane. However, the steering column 128, the lever arms 132, 134 and the link rods 146, 148 are offset from the center plane VCP toward the right side of the snowmobile 20.

In the illustrated embodiment, the steering column 128 is affixed to a U-shaped tubular member 238 (FIG. 2), which is described in greater detail below, by the support member 158. The steering column 128 also is journaled on a frame member 223 (FIGS. 2–6), which is described in greater detail below.

With reference to FIGS. 1 and 2, each ski 44 has a ski shaft (not shown) that extends generally upwardly from the ski 44 and through a holder 164 which is affixed to an outer end of each swing unit 46. The ski shaft can pivot about a ski axis of the ski shaft which is generally consistent with an axis of the holder 164. A coupling link 168 couples each steering rod 154, 156 with a top portion of the ski shaft. The ski 44 pivots about the ski axis relative to the holder 164 when the coupling link 168 pulls or pushes the ski shaft.

The lever arms 136, 138 are journaled on the frame assembly 22. In the illustrated arrangement, the lever arms 136, 138 are journaled on a cross member (not shown) which connects members of a front frame 202 (FIGS. 2 and 3). The front frame 202 is described in greater detail below.

With reference to FIGS. 1, 2, 14 and 15, when the rider turns the handle bar 122 right or left, the steering shaft 120 and the steering column 128 pivot about respective own axes to move the link rod 148 as indicated by the arrow 176 (FIG. 15). The steering rods 154, 156 thus move as indicated by the arrow 178 (FIG. 15) to pull or push the respective coupling links 168. The ski shafts pivot about the ski axes to direct the skis 44 right or left. Accordingly, the snowmobile 20 turns to the direction that the rider desires.

With reference to FIGS. 2, 3 and 11–13, a general construction of the frame assembly 22 is described in greater detail below.

The frame assembly 22 generally comprises a body frame 200, a front frame 202 and a rear frame 204. The body frame 200 is disposed center of the frame assembly 22 and forms a main body of the snowmobile 20. The front frame 202 is disposed forward of the body frame 200 and forms a front body of the snowmobile 20. The rear frame 204 is disposed rear of the body frame 200 and forms a rear body of the snowmobile 20.

Figure 11:
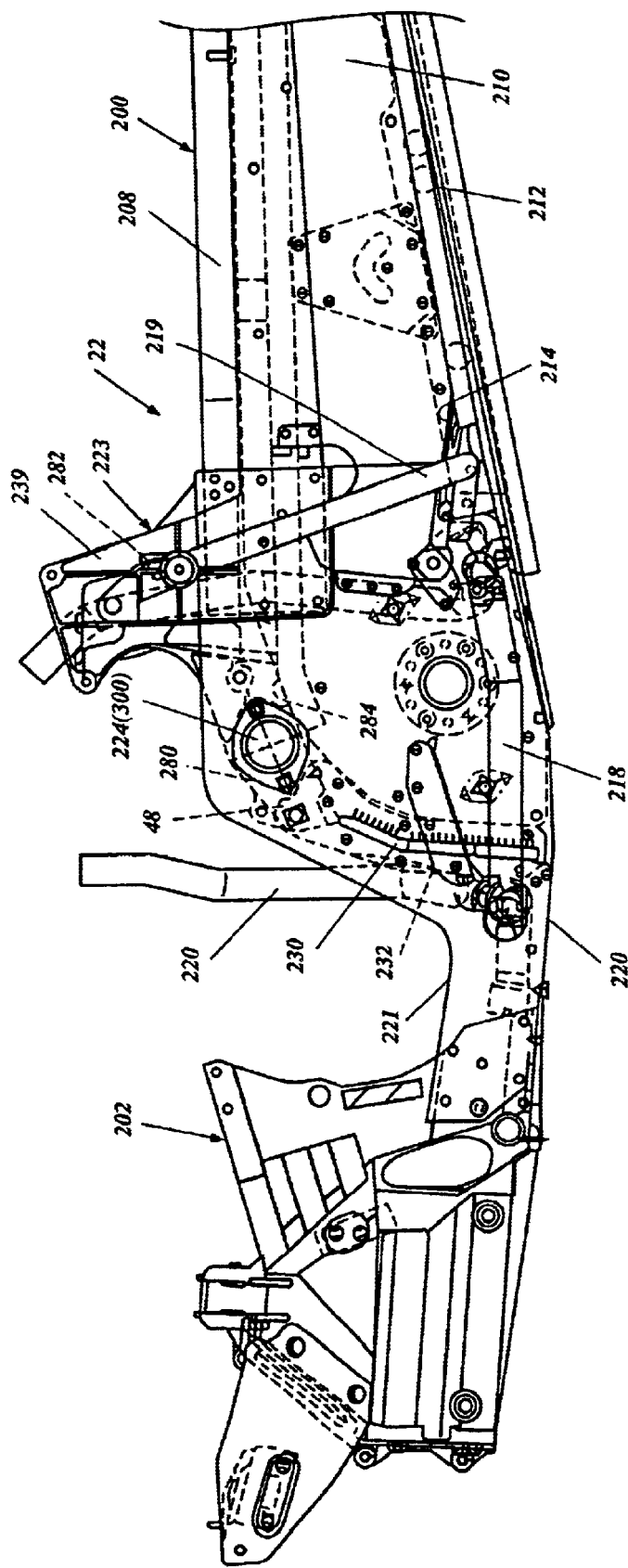
FIG. 11 is a partial side elevational view of the frame assembly generally corresponding to the part illustrated in FIG. 3. Part of an engine cooling system is shown in this figure.

With particular reference to FIGS. 2, and 11–13, the body frame 200 preferably comprises an upper horizontal section 208, side vertical sections 210 and lower horizontal sections 212. The upper horizontal section 208 extends fore to aft and forms a center area of the body frame 200. The side vertical sections 210 extend vertically downwardly from both sides of the upper horizontal section 208. The lower horizontal sections 212, in turn, extend horizontally outwardly from lower ends of the side vertical sections 210. As shown in FIG. 11, the illustrated horizontal sections 212 slightly slant downwardly and forwardly.

Figure 12:
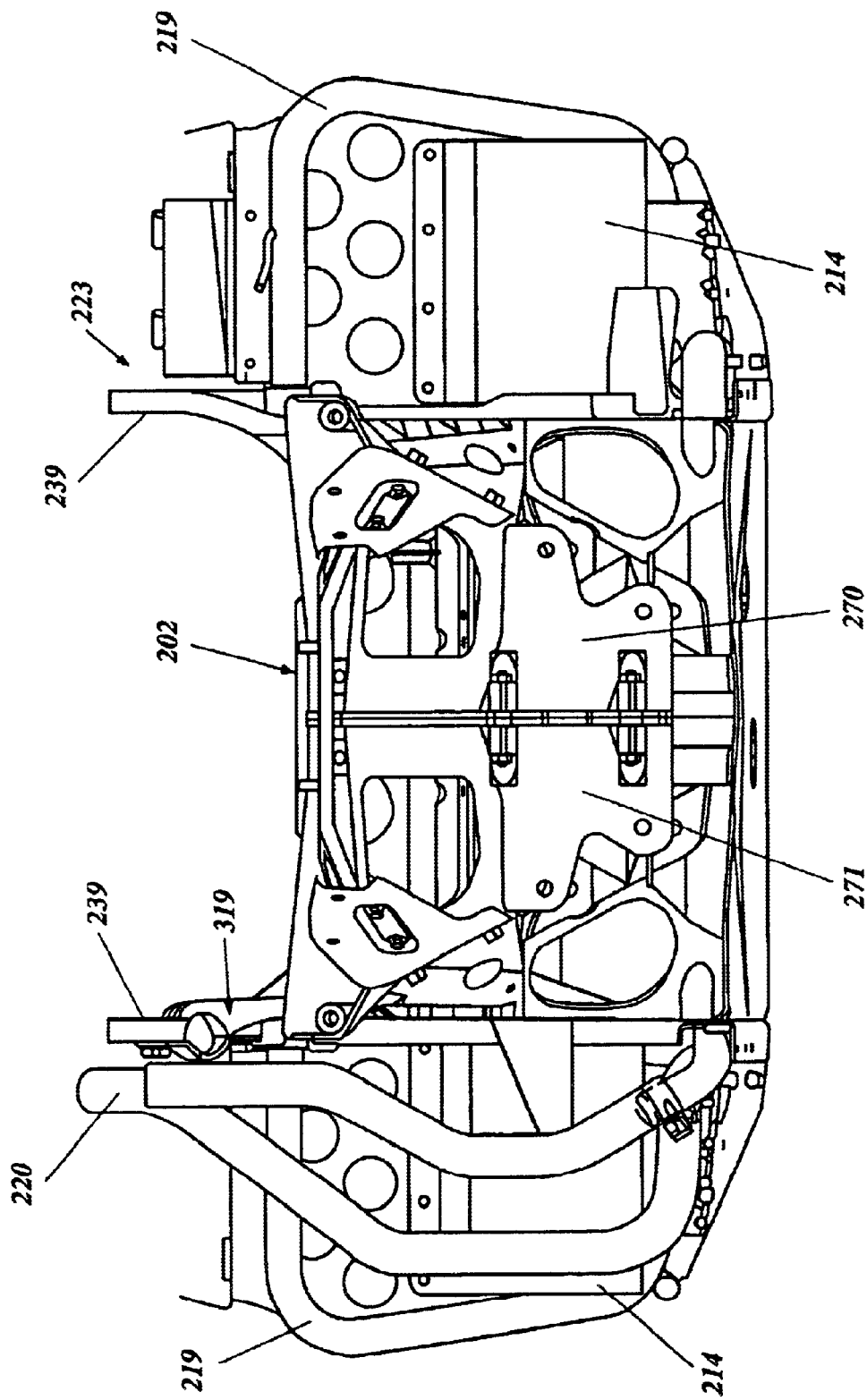
FIG. 12 is a front elevational view of the frame assembly. The part of the engine cooling system also is shown in this figure.
Figure 13:
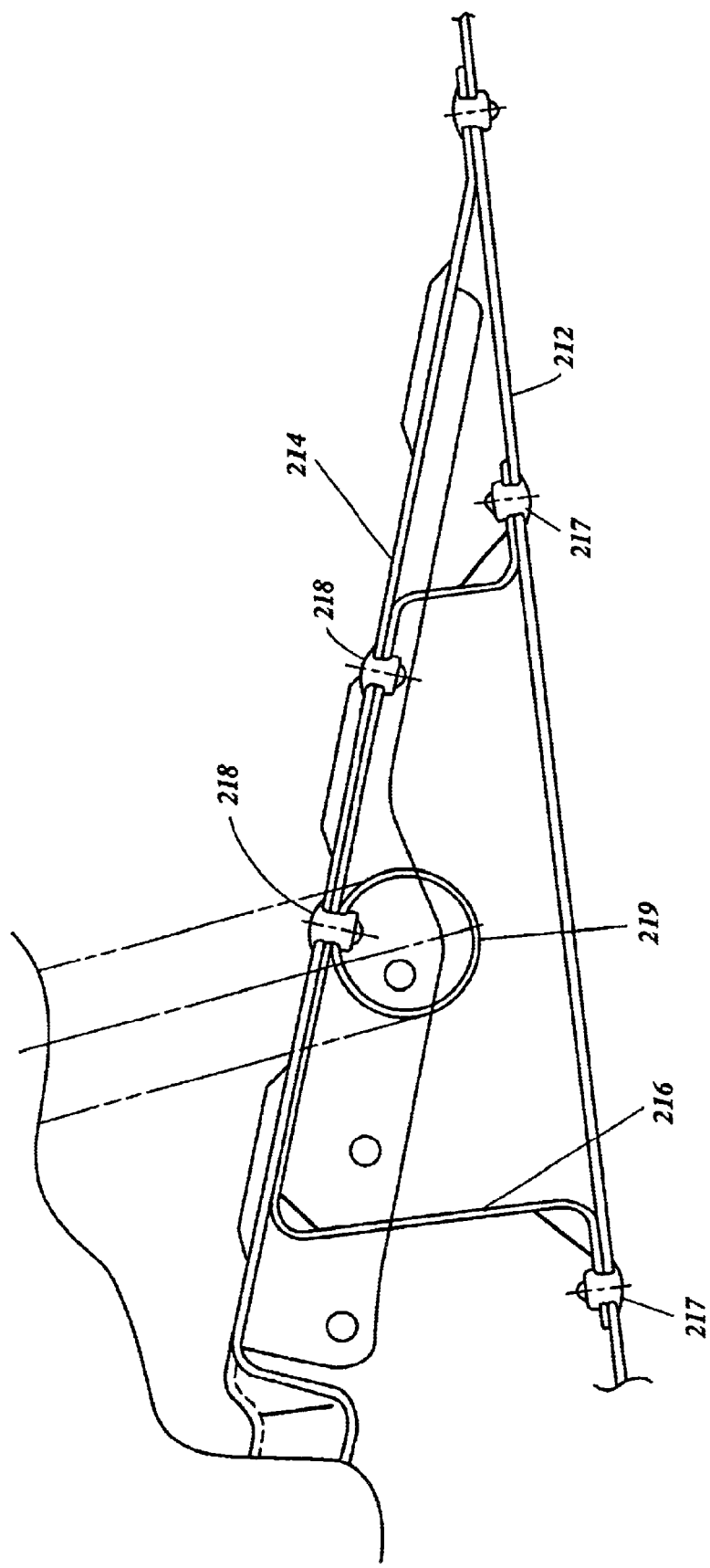
FIG. 13 is an enlarged side elevational view of a foot step formed at the frame assembly.

The lower horizontal sections 212 preferably form foot step areas. As shown in FIGS. 11–13, at respective forward ends of the horizontal sections 212, a pair of foot steps 214 is disposed. As shown in FIG. 13, a support member 216 is affixed to each horizontal section 212 by rivets 217. The support members 216 are made of a sheet metal. Each sheet is bent to generally form a trapezoid that has a forward end higher than a rear end. The foot steps 214 are affixed to respective top surfaces of the support members 216 by rivets 218.

A pair of support pipes 219 preferably supports the respective foot steps 214. The illustrated support pipes 219 have a lower end affixed to the frame assembly 22 and an upper end affixed to the frame assembly 22 at a location higher than a portion where the lower end is affixed. Each support pipe 219 extends outwardly from the lower end along a bottom surface of each support member 216, extends generally upwardly out of the step 214 and then extends inwardly above the step 214 to the upper end. Each support pipe 219 is coupled with the support member by one of the rivets 218. The foot steps 214 thus can be rigidly affixed to the lower horizontal section 212 on the left hand side and then forwardly to the lower horizontal section 212 on the right hand side.

Heat exchange devices (not shown) preferably are coupled with the respective lower horizontal sections 212. The heat exchange devices are part of an engine cooling system. Water delivery pipes 220 are provided to circulate cooling water within the cooling system. One of the delivery pipes 220 extends rearwardly to the rear frame 204 from the lower horizontal sections 212.

Preferably, the upper horizontal section 208 is formed separately from the other part of the body frame 200. The upper horizontal section 208 can be made of, for example, a sheet metal. Both sides of the upper horizontal section 208 can be lower than a center portion thereof to reinforce the section 208. The upper horizontal section 208 can be formed by, for example, a press or stamping process. The side vertical sections 210 and the lower horizontal sections 212 preferably are unitarily formed with each other and is made of, for example, a sheet metal and is formed by a press or stamping, or is made of an extruded aluminum alloy material.

The sections 208, 210, 212 can be entirely unitarily formed with each other. Alternatively, the sections 208, 210, 212 can be completely separately formed. Additionally, the sections 208, 210, 212 can be produced by any methods other than the methods described above. For example, the sections 208, 210, 212, unitarily formed or separately formed, can be produced by a mold casting, die-casting or lost-wax casting process. Similarly, the other components and/or members described below also can be formed with any metal or plastic material and can be formed by any conventional method regardless of being expressly described or not, except as noted herein.

With particular reference to FIGS. 2 and 3, the illustrated body frame 200 additionally comprises side panels 221, a floor panel 222 and a frame member 223. Each of the panels 221, 222 and the frame member 223 preferably are produced by the mold casting, die-casting or lost-wax casting process.

The side panels 221 are affixed to the respective side sections 210 by welding or by fasteners such as, for example, bolts or rivets. The side panels 221 define openings 224 (FIG. 3) through which the transfer shaft 60 (FIG. 1) extends. The driven pulley 56 is positioned adjacent an outer surface of the side panel 221 on the left side. In the illustrated embodiment, the lower ends of the support pipes 219 of the foot steps 214 are affixed to the side panels 221. The floor panel 222 extends between lower ends of the side panels 221 to form a bottom portion of the engine compartment 26.

The frame member 223 extends between upper portions of the side panels 221 and generally covers a front end of the upper horizontal section 208. The frame member 223 defines the rear engine mounts 48 and the openings 103 for the exhaust runners 102 (FIG. 1). The frame member 223 also forms three bosses 228 onto which a heat insulating cover 106 (FIGS. 7 and 8), which is described below, for the exhaust system 100 is mounted.

Another heat exchange device 230 for the engine 28 is disposed below the frame member 223. The cooling water of the engine 28 also circulates through the heat exchange device 230. The heat exchange device 230 preferably is affixed to the side panels 221 and the frame member 223 and form part of the frame assembly 22 together with the side panels 221. The illustrated heat exchange device 230 has flanges 232 (FIG. 11) that are affixed to the side panels 221 and the frame member 223 by rivets or bolts. In the illustrated embodiment, the flanges 232 are affixed to the side panels 221 together with engine bosses as described below with reference to FIG. 9. The frame member 223 and the heat insulating cover 106 are described in greater detail below with particular reference to FIGS. 4–10.

The body frame 200 thus is rigidly formed with the foregoing components and members. To further increase the rigidity of the frame assembly 22 and to be coupled with the front frame 202, the frame assembly 22 preferably includes a frame reinforcement 234 (FIG. 2) secured to the body frame 200. The reinforcement 234 desirably is generally rectangularly shaped and advantageously is disposed generally above the engine 28. Thus, the engine 28 is positioned within a cavity defined between the side panels 221, above the floor panel 222, forward of the frame member 223 and below the reinforcement 234.

The illustrated reinforcement 234 preferably comprises a generally rectangular tubular member 238 that is bent into a U-shape. The tubular member 238 preferably is made of an extruded aluminum alloy material. A bight of the U-shape is disposed forwardly in the illustrated arrangement. Rear ends of the tubular member 238 are affixed to upwardly extending portions 239 of the frame member 223, which is described in greater detail below. A bar 240 extends between the two legs of the U-shaped tubular member 238 at the end opposite the bight. The bar 240 reinforces the open end of the U-shape defined by the tubular member 238. A second bar 242 extends upward and between rear ends of the tubular member 238 to further reinforce the reinforcement 234. Furthermore, a support unit 244 extends upward and rearward from the bar 240 to the second bar 242. The illustrated steering handle assembly 42 is affixed to the support unit 244 by the support members 126, 127 (FIGS. 14 and 15).

A holder member 248 is coupled with a front portion of the tubular member 238 by welding or by fasteners such as, for example, bolts or rivets. The holder member 248 preferably is made of sheet metal and is formed by a bending process. The front portion of the tubular member 238 is nested in a recessed portion defined by the holder member 248. Four bolts 250, for example, are planted at the holder member 248 with threaded portions thereof extending generally upwardly and forwardly.

With reference to FIG. 2, the rear frame 204 preferably comprises a generally flat shaped member 254 having a recessed portion. The illustrated member 254 of the rear frame 204 can be formed with a casting. Alternatively, the member 254 can be formed with a sheet metal by a press process. The rear frame 204 is coupled with the body frame 200 in a suitable manner. The exhaust silencer box (not shown) is disposed on the rear frame 204. The grab bar 36 and the water delivery pipe 214 are fixed to the rear frame 204.

With continued reference to FIGS. 2 and 3, the front frame 202 preferably comprises a pair of generally symmetrically formed front members 270, 271 which are coupled with each other. Preferably, the front members 270, 271 are made of aluminum alloy and are formed by, for example, a mold casting, a die-casting, or lost-wax casting process. The front members 270, 271 are connected with each other by fasteners 276 on front surfaces and by the cross member (not shown) on their rear surfaces. Each side portion of the front members 270, 271 is coupled with each side panel 218 by welding or by suitable fasteners such as, for example, bolts or rivets.

The front members 270, 271 support the swing units 46 on the respective side portions. Each swing unit 46 in the illustrated arrangement is formed with a pair of linked tubular members disposed above and below, although any other construction can be applied. Each side portion of the front members 270, 271 defines a recess (not shown) recessed inwardly. Each swing unit 46 is placed at the recess and is swingably journaled on the side portion.

A top side portion of each front member 270, 271 forms a mount boss. A top end of each suspension assembly 47 is journaled at the mount boss for pivotal movement. A lower end of each suspension assembly 47 is affixed to a portion of the lower linked member of each swing unit 46 where the holder 45 is attached, or is directly affixed to the holder 164.

Each side portion of the front member 270, 271 is coupled with a forward-most end 272 (FIG. 3) of each side panel 221 by welding or by suitable fasteners such as, for example, bolts or rivets. Each side portion of the frame member 270, 271 also defines the forward engine mount boss 49 (FIG. 3) through which a bolt hole 274 is formed. The engine mount construction is described in greater detail below with reference to FIGS. 9 and 10.

With reference to FIGS. 2, 4–6, 11 and 12, the frame member 223 preferably is a single member and generally comprises a pair of side sections 280, a rear section 282 and a bottom section 284. As described above, the frame member 223 preferably is produced by a casting process so that the side, rear and bottom sections 280, 282, 284 are unitarily formed with each other. The frame member 223 thus provides enhanced rigidity.

A downward slope 288 is formed at a forward-most end of the bottom section 284. Seven holes 290 are formed on the downward slope 288 and around the downward slope 288. Rivets or bolts are inserted into the holes 290 to fix one of the flanges 232 of the heat exchange device 230 so that the heat exchange device 230 depends from the frame member 223. The bosses 228 for affixing the heat insulating cover 106 to the frame member 223 also are formed in the area of the bottom section 284 adjacent to the holes 290.

Figure 4:
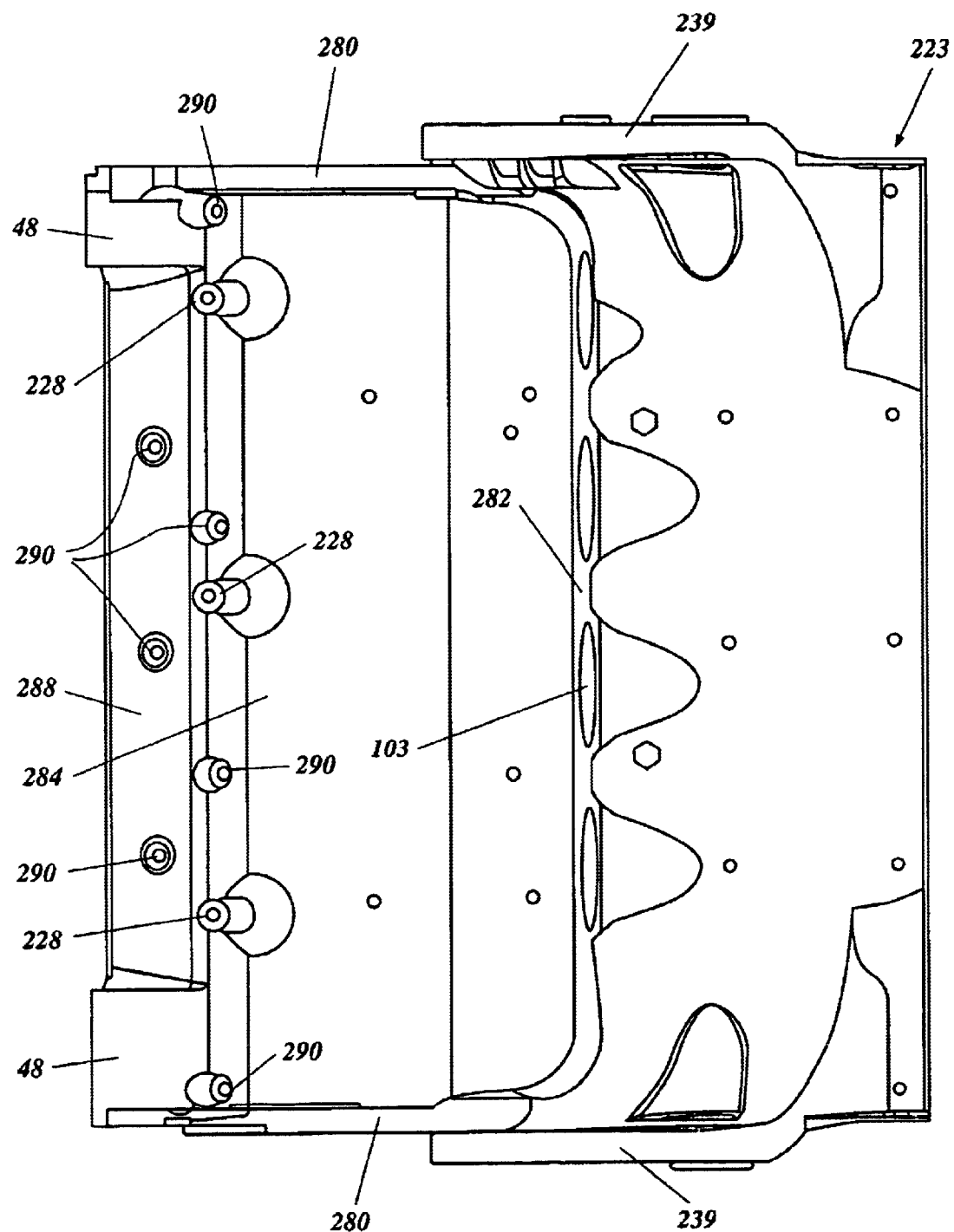
FIG. 4 is a top plan view of a front member that forms a portion of the frame assembly.
Figure 5:
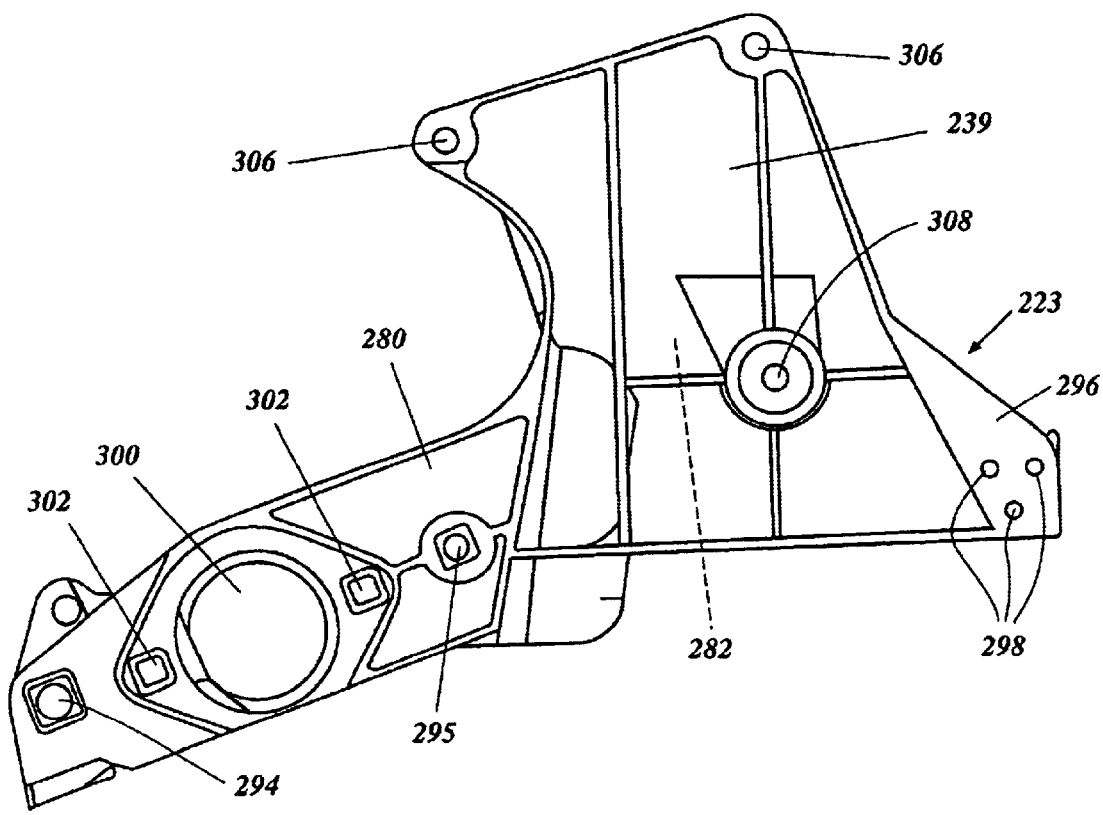
FIG. 5 is a side elevational view of the frame member.

As shown in FIG. 5, each side section 280 has bolt holes 294, 295. The rear section 282 defines a rearward extending portion 296 on each side. Each rearward extending portion 296 also defines rivet holes 298. The side sections 280 and the rearward extending portions 296 are affixed to the side panels 221 of the body frame 200 so that the frame member 223 is affixed to the body frame 200. As shown in FIG. 4, the side sections 282 define the rear engine mounts 48 on both sides of the downward slope 288. The illustrated bolt holes 294, which are located forwardly, are used to receive a rear engine mount bolt 299 (FIG. 9) as described below. The bolt holes 294, 295 positioned on the left hand side preferably have a rectangular shape because the preferred bolts have a rectangular shaped portion that can prevent the bolts from rotating.

Each side section 280 also defines an opening 300 corresponding to the opening 224 of the side panel 221 of the body frame 200. The transfer shaft 60 (FIG. 1) extends through the openings 224 and is journaled on bearings 418 (FIG. 20) at the side sections 280. Each bearing is held by a bearing holder 301 (FIG. 20) which is affixed to each side section 280 by bolts. Bolt holes 302 for the bolts are formed generally on front and rear sides of the opening 300. The bolt holes 302 positioned on the left hand side also have a rectangular shape because the preferred bolts have a rectangular portion that can prevent the bolts from rotating.

The rear section 282 defines the openings 103 through which the exhaust runners 102 (FIG. 1) extend. The rear section 282 extends upwardly and generally normal to the bottom section 284. This is advantageous because the openings 103 can be small as possible and the stiffness of the frame member 223 enhanced. On both sides of the rear section 282, the upwardly extending portions 239 are formed.

With reference to FIG. 5, the respective portions 239 define bolt holes 306 where bolts are inserted to fix the rear ends of the U-shaped tubular member 238. Both sides of the rear section 282 defines recessed portions 308 under the upwardly extending portion 239. The upper ends of the support pipe 219 for the foot steps 214 are affixed to the recessed portions 308 by bolts.

Figure 6:
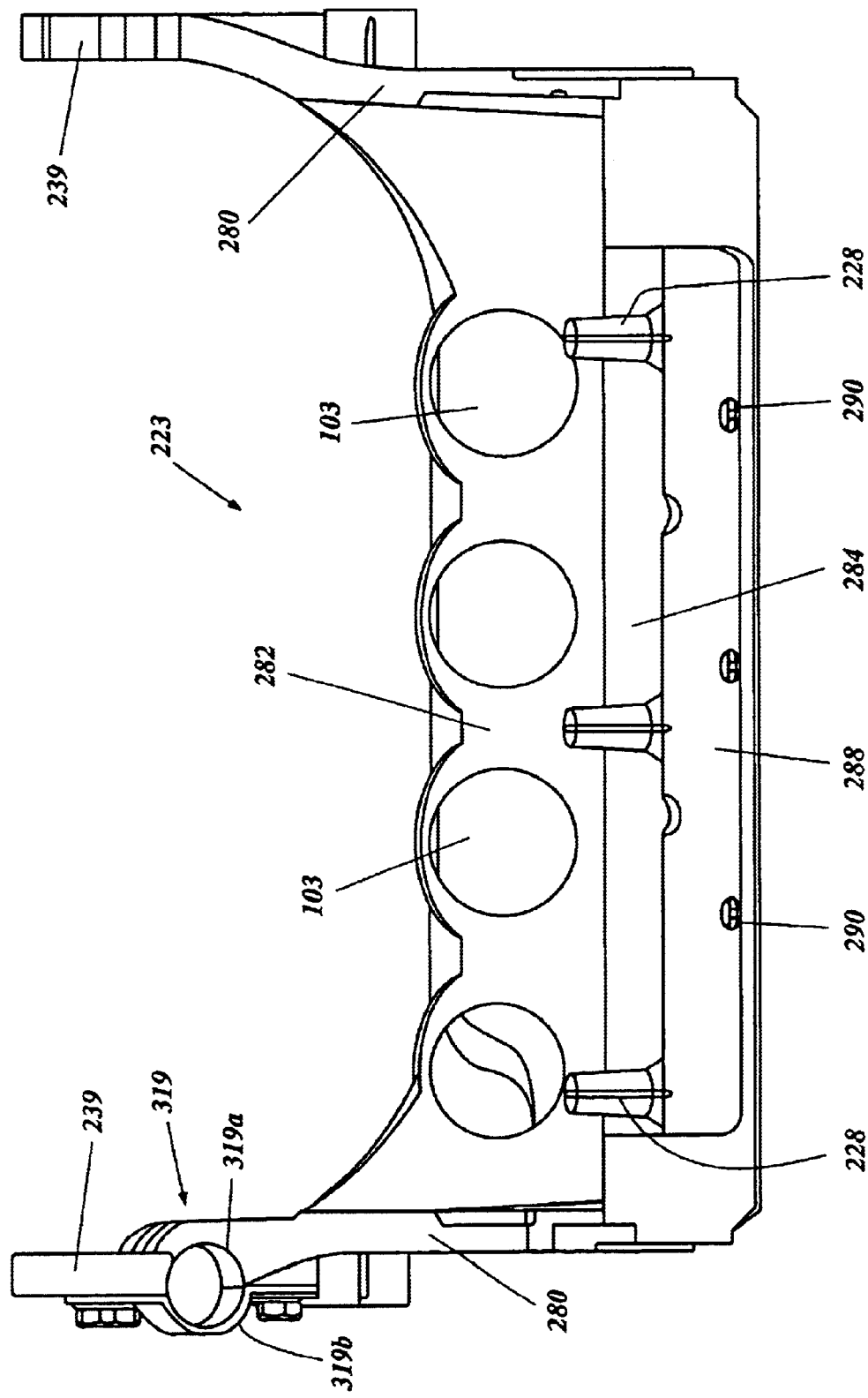
FIG. 6 is a front elevational view of the frame member.

The upwardly extending portion 239 on the left hand side preferably defines a journal portion 319 (FIGS. 6 and 12). The steering column 128 is journaled at the journal portion 319 for pivotal movement. The illustrated journal portion 319 comprise a semicircular recess 319a and a bracket 319b that is affixed to the upwardly extending portion 239 by bolts.

Figure 8:
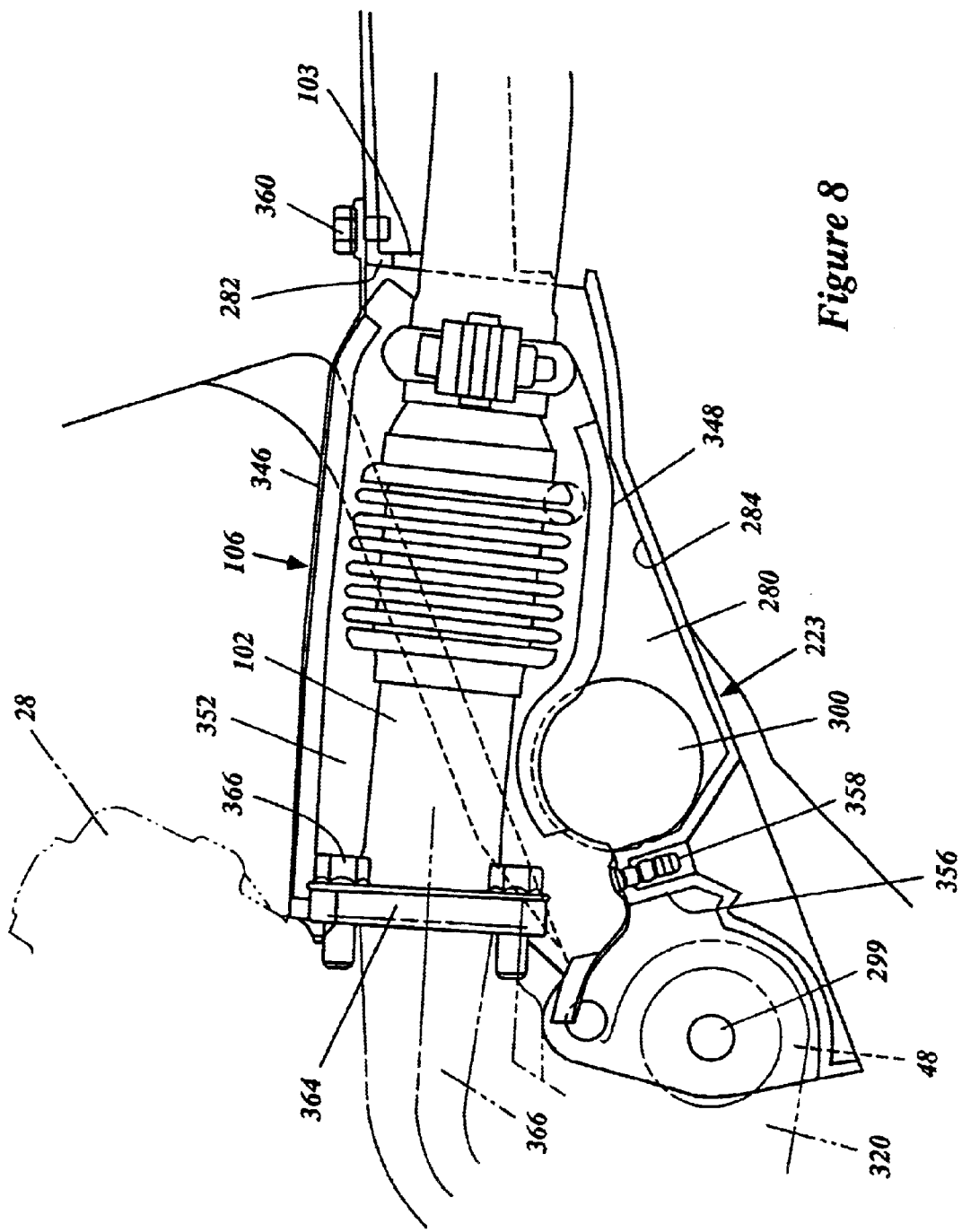
FIG. 8 is a side elevational view of a portion of the frame member and the heat insulating cover. The heat insulating cover is illustrated in cross-section. One of exhaust runners extending through the heat insulating cover is shown in solid line. An engine snowmobile are shown in phantom.
Figure 9:
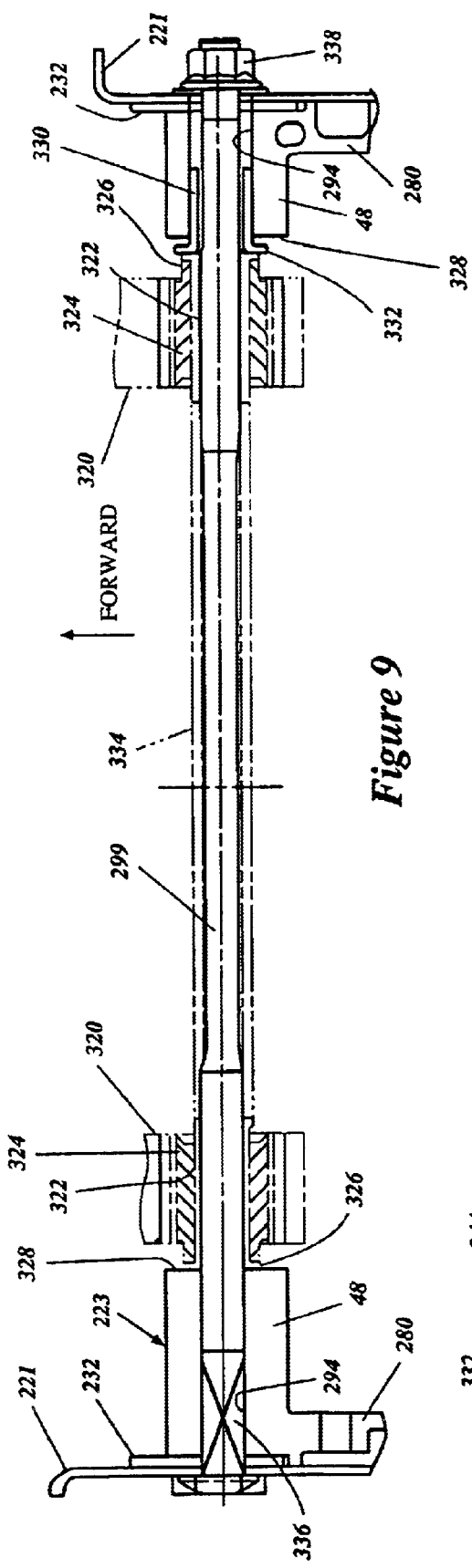
FIG. 9 is a top plan view of a rear engine mount. Rear mount bosses of the engine and a collar are shown in phantom.

With reference to FIGS. 8 and 9, a rear engine mount construction in this embodiment is described in greater detail below.

The illustrated engine 28 defines a pair of rear engine bosses 320 which are spaced apart from each other. Each engine boss 320 bears a metal collar 322 with a rubber tube 324 baked thereto. Each collar 322 defines a flange 326 extending outwardly beyond a side end of the engine boss 320. The flange 326 of the collar 322 of the engine boss 320 on the left hand side faces an inner surface 328 of the mount boss 48 on the same side. The inner surface 328 is a reference surface of the rear engine mount construction in this embodiment.

The mount boss 48 on the right hand side includes internal female threads. A cylindrical male screw member 330 is screwed into the female threads. A position of the cylindrical member 330 thus is adjustable relative to the mount boss 48. The cylindrical member 330 defines a flange 332 extending inwardly beyond a side end of the boss 48 toward the flange of the collar 322.

The rear engine mount bolt 299 has a length that is longer than a distance between an outer surface of the mount boss 48 on the left hand side and an outer surface of the mount boss 48 on the right hand side. This elongate mount bolt 299 extends through the bolt holes 294 of the respective mount bosses 48 and collars 322 of the respective engine bosses 320. An elongate collar 334 encloses a center portion of the mount bolt 299. The bolt 299 defines a rotation preventing portion 336 that has a rectangular shape in cross-section next to the bolt head of the bolt 299. A nut 338 is screwed down onto the outer end of the mount bolt 299 that extends beyond the side panel 221 on the right hand side to complete the rear engine mount construction.

In the illustrated embodiment, each flange 232 of the heat exchange device 230 is interposed between the side panel 221 and the mount boss 48 on the same side. The mount bolt 299 thus is used to fix the heat exchange device 230 to the side panels 221 together with the engine 28.

In a preferred mounting process of the engine 28, the cylindrical member 330 is screwed down into the female threads of the mount boss 48 to define a space between the reference surface 328 of the mount boss 48 on the left hand side and the flange 332 of the cylindrical member 330. The space is longer than a distance between the flanges 326 of the engine bosses 320. The engine 28 is placed such that the engine bosses 320 are positioned between both the mount bosses 48. Then, a tool is used to rotate the cylindrical member 330 so that the member 330 approaches the flange 326 of the engine mount 320 on the same side. The cylindrical member 330 is rotated until the flange 332 thereof abuts the flange 326 of the engine boss 320. The elongate collar 334 is positioned between the collars 322 of the engine mounts 320. The mount bolt 299 is then inserted into the side panel 221, the flange 232 of the heat exchange device 230, the mount boss 48 and the collar 322 of the engine boss 320, which are on the left hand side. The bolt 299 is further inserted into the elongate collar 334, and the collar 322 of the engine boss 320, the cylindrical member 330 within the mount boss 48, the flange 232 of the heat exchange device 230 and the side panel 221, which are on the right hand side. The nut 338 is finally screwed down onto the outer end portion of the mount bolt 334.

The adjustable cylindrical member 330 is advantageous because the engine mounts 320 can be securely kept in position even though the distance between the flanges 322 are shorter than a distance between both the mount bosses 48. The rectangular shaped portion 336 of the mount bolt 334 is useful because the nut 338 can be easily screwed down without necessitating any tool to prevent the bolt 299 from rotating. Also, the illustrated mount bolt 299 can act as a cross member that reinforces the frame member 223.

Figure 10:
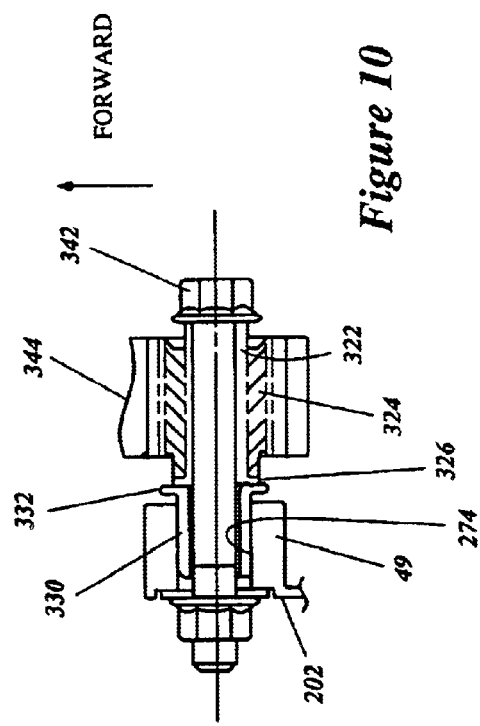
FIG. 10 is a top plan view of a front engine mount on the left hand side. A front mount boss is shown in phantom.

FIG. 10 illustrates a front engine mount construction on the left hand side. A front engine mount construction on the right hand side can be similar to that on the left hand side. Both of the front engine mount constructions also are similar to the rear engine mount construction described above except that each mount bolt 342 is provided at each set of the mount boss 49 and an engine mount 344 and that each bolt 342 has no rectangular shaped portion. The same members and portions as those described in connection with the rear engine mount construction of FIG. 9 are assigned with the same reference numerals and are not described repeatedly. Either one of the cylindrical members 330 on the right hand construction or the left hand construction can be omitted. In this alternative, the flange 326 of the collar 322 associated with the mount boss 49 that has no cylindrical member 330 can directly abut the mount boss 49.

Figure 7:
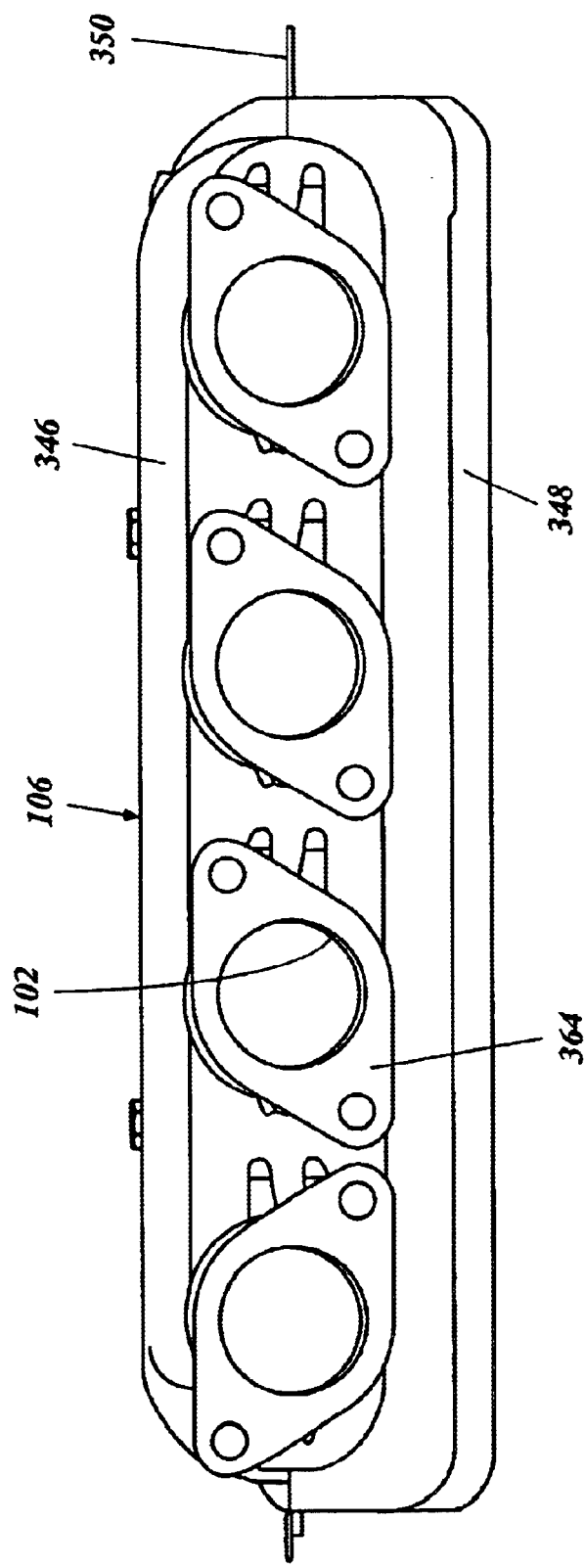
FIG. 7 is a front elevational view of a heat insulating cover disposed above the frame member.

With reference to FIGS. 7 and 8, the heat insulating cover 106 is disposed in front of the rear section 282 of the frame member 223 and above the bottom section 284 thereof. The insulating cover 106 is generally formed as a box shape and preferably is formed with a top cover member 346 and a bottom cover member 348. The top and bottom cover members 346, 348 preferably are made of an iron sheet metal. Each sheet is bent into a generally recessed shape in, for example, a press process. The top and bottom members 346, 348 have peripheral flanges 350 that can be affixed to each other with bolts (not shown). Thus, a cavity 352 (FIG. 8) is defined between the top and bottom cover members 346, 348 when the members 346, 348 are coupled together.

The heat insulating cover 106 preferably is affixed to the frame member 223. In the illustrated arrangement, the frame member 223 has bosses 356 (FIG. 8) positioned between the rear engine mount bosses 48 and the opening 300 of the transfer shaft 66. The bottom cover member 348 is affixed to the bosses 356 by rivets 358. The top cover member 346 is affixed to a top surface of the rear section 282 of the frame member 223 by bolts 360.

The rear section 282 defines the openings 103 and the exhaust runners 102 extend forwardly through the openings 103 toward the heat insulating cover 106 and enter the cavity 352 of the cover 106 to further extend within the heat insulating cover 106. The respective forward ends of the exhaust runners 102 have flanges 364. The flanges 364 are affixed to the engine 28 by bolts 366 with the exhaust passages of the runners 102 connected to inner exhaust passages 366 of the engine 28. The exhaust runners 102 thus are entirely covered by the heat insulating cover 106 between the engine 28 and the frame member 106.

With reference to FIGS. 16–18, the transfer shaft 60 extends outwardly beyond the side panel 221 of the body frame 200 through the opening 300 formed on the right hand side. The transfer shaft 60 preferably is journaled by a pair of ball bearings 370 affixed to inner and outer housing members 372, 374 of the chain housing 63, respectively. The bearings 370 are retained in respective fixed positions by suitable fasteners such as, for example, snap rings 376. A drive sprocket 377 is disposed between the bearings 370 and is affixed to the transfer shaft 60.

The housing members 372, 374 preferably are coupled together and are further affixed to the side panel 221 and the frame member 223 by two bolts 378 (FIGS. 16 and 17) in an upper area of the chain housing 63. The housing members 372, 374 also are coupled together and are affixed only to the side panel 221 by bolts 380. Other bolts, for example, a bolt 381 (FIG. 180) can be used for coupling only both of the housing members 372, 374. A seal member 380 preferably is interposed between the inner and outer housing members 372, 374.

The drive shaft 62 extends parallel to the transfer shaft 60 and outwardly beyond the side panel 221 through an opening 382. The drive shaft 62 preferably is journaled by another ball bearing 384 affixed to the inner housing member 372 of the chain housing 63. The bearing 384 is retained in a fixed position by a suitable fastener such as, for example, snap ring 386. A driven sprocket 388 is disposed at an outer end of the drive shaft 62 and is affixed thereto. The driven sprocket 388 preferably has an outer diameter larger than an outer diameter of the drive sprocket 377.

A chain 390 is wound around the drive and driven sprockets 377, 388. The transfer shaft 60 thus can rotate the drive shaft 62 through the chain 390. The drive shaft 62 drives the drive belt 70 as described above. Any transmitter such as, for example, a belt can replace the chain. In this alternative, pulleys replace the sprockets accordingly.

A disk brake device 394 preferably is disposed at an outer end of the transfer shaft 60. The brake device 394 generally comprises a brake disk 396 and a hydraulic caliper 398. The brake disk 396 is rotatably affixed to the transfer shaft 60 so as to rotate together with the transfer shaft 60. The caliper 398 is affixed to a bracket portion 400 of the outer housing member 374 by bolts 402. The caliper 398 carries brake pads 403 that pinch the brake disk 396 therebetween to slow or stop the rotation of the brake disk 396. Brake fluid can be supplied to the caliper 398 through a suitable hydraulic system. Supply of the hydraulic fluid can be controlled by the operator with a brake lever (not shown) preferably disposed at the handle bar 122.

Figure 19:
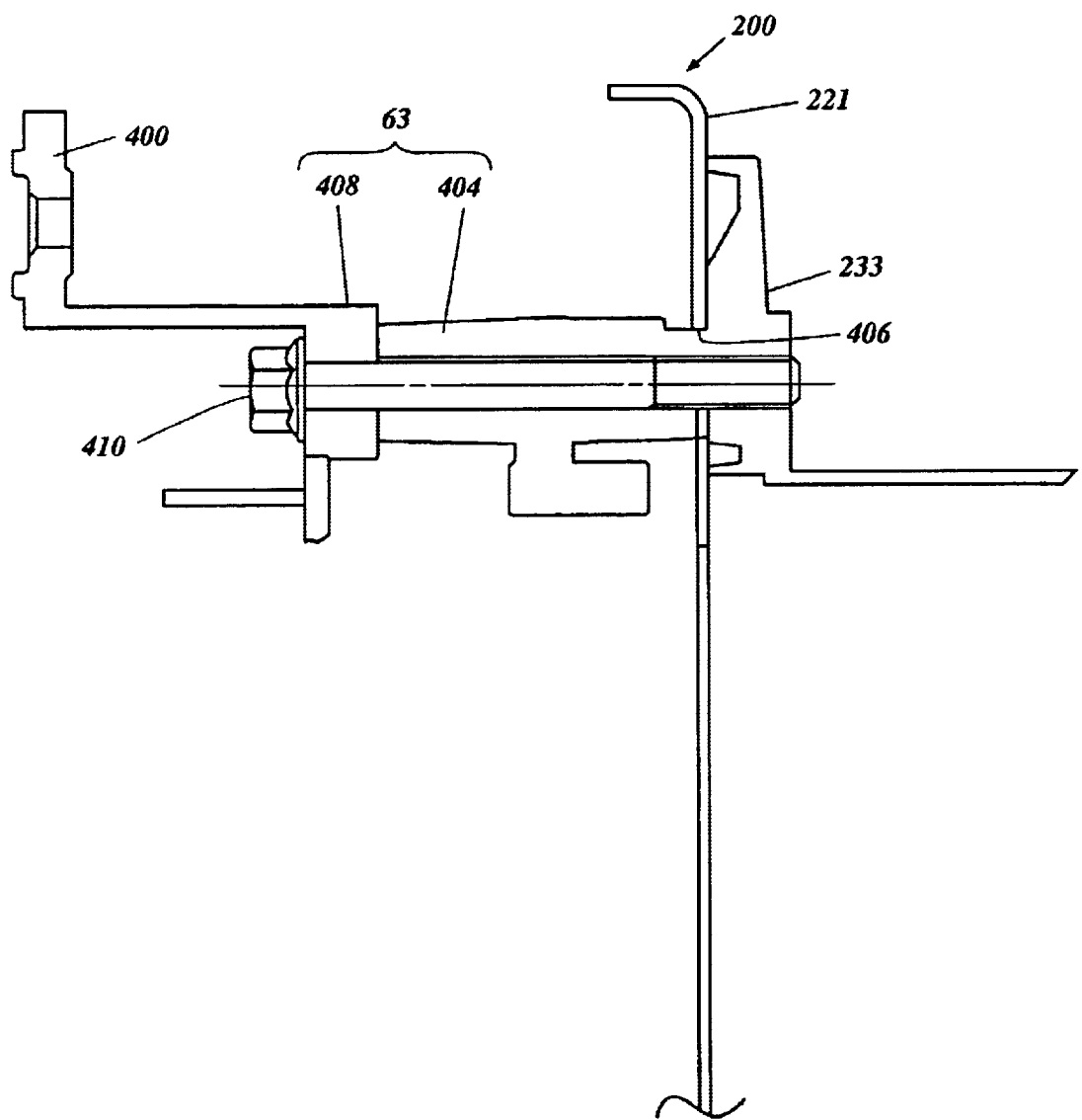
FIG. 19 is a cross sectional view of a modification of the chain housing that is shown in FIG. 17.

The inner housing member 372 of the chain housing 63 can be unitarily formed with the frame member 223. In this alternative, as shown in FIG. 19, an inner housing portion 404 can extend outwardly from the frame member 223 through an opening or recess 406 formed at a portion of the side panel 221. An outer housing member or cover member 408 can be affixed to the inner housing portion 404 by bolts 410 to complete the chain housing 63.

The heat exchange device 230 also is illustrated in FIG. 16. The heat exchange device 230 preferably has a plurality of radiator fins 412 as shown in this figure.

Figure 20:
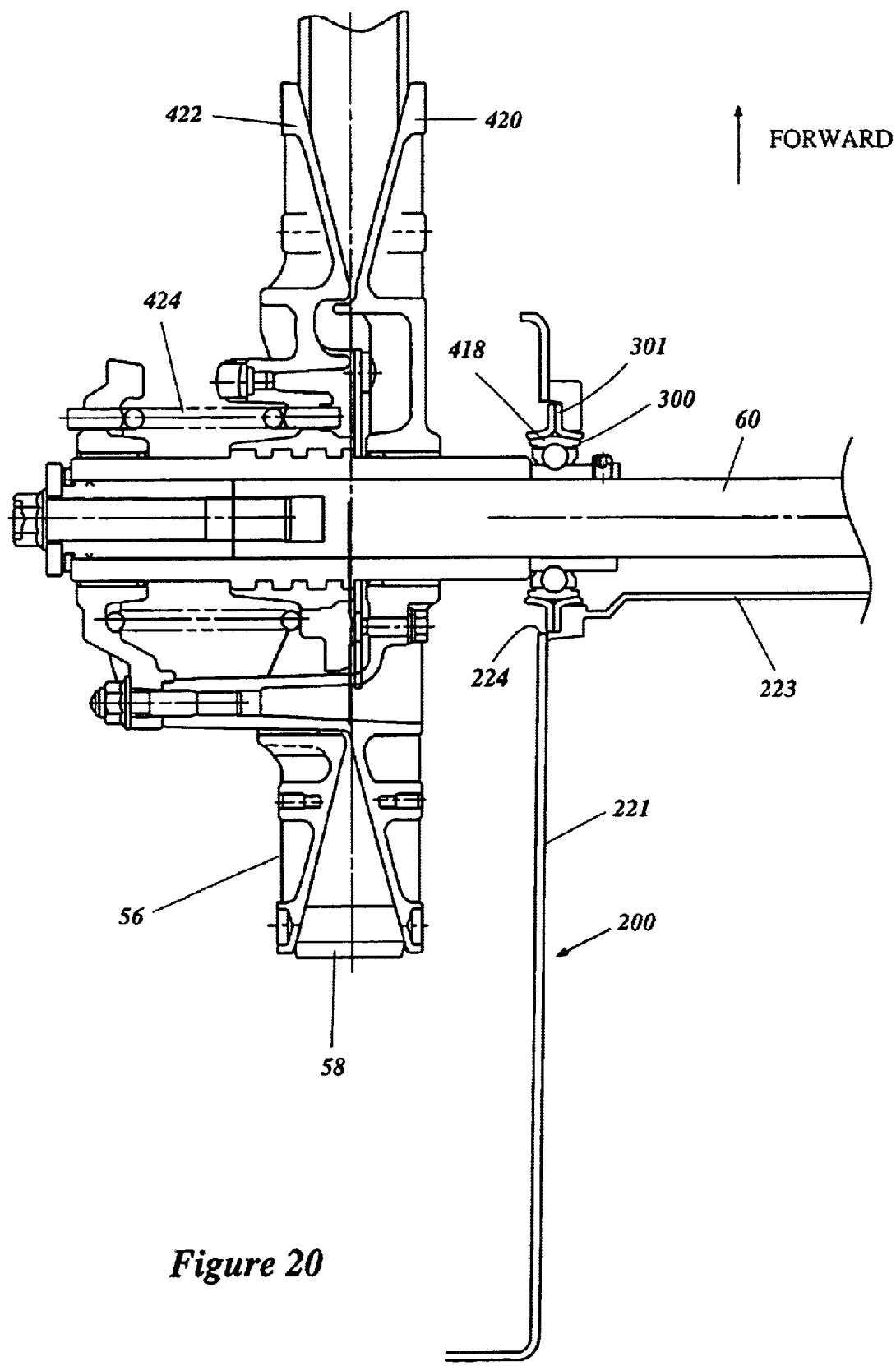
FIG. 20 is a partial sectional and top plan view of a v-belt transmission of the snowmobile. A portion of the frame assembly also is shown.

With reference to FIG. 20, the v-belt transmission 52 is illustrated. The transfer shaft 60 extends outwardly beyond the side panel 221 of the body frame 200 through the opening 300 of the frame member 223 and the opening 224 of the side panel 221 both formed on the left hand side. The transfer shaft 60 preferably is journaled by a ball bearing 418. The illustrated bearing 418 is held by the bearing holder 301 that is affixed to the frame member 223 by bolts (not shown) that extend through the bolt holes 302 (FIG. 5).

The driven pulley 56 comprises inner and outer sheaves 420, 422. The inner sheave 420 is affixed to the outer end of the transfer shaft 60, while the outer sheave 422 is movable relative to the inner sheave 420. A spring 424 urges the outer sheave 422 toward the inner sheave 420. The v-belt 58 is interposed between the inner and outer sheaves 420, 422. A diameter of the driven pulley 56 thus is continuously variable for the variable transmission.

The bearing holder 301 can be replaced by a combination of a recess formed at the frame member and a snap ring.

As described above, because the frame member is formed with a single piece, i.e., not combined pieces, in the illustrated embodiment, the frame member not only provides enhanced rigidity but also provides enhanced accuracy in distances between the shafts.

The same snowmobile is disclosed in co-pending U.S. patent application Ser. No. 10/214,915, filed Aug. 7, 2002, and U.S. patent application Ser. No. 10/213,726, filed Aug. 6, 2002, the entire contents of which are hereby expressly incorporated by reference.

Although the present invention has been described in terms of a certain embodiment, other embodiments apparent to those of ordinary skill in the art also are within the scope of this invention. Thus, various changes and modifications may be made without departing from the spirit and scope of the invention. The scope of the present invention is intended to be defined only by the claims that follow.

What is claimed is:

1. A snowmobile comprising a frame assembly, a drive assembly depending from the frame assembly and adapted to abut the terrain so as to propel the frame assembly along the terrain, an internal combustion engine configured to power the drive assembly, the engine including an output shaft, a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, the frame member supporting the engine in front of the transfer shaft, and an exhaust system configured to discharge combustion byproducts of the engine, the exhaust system comprising an exhaust runner, the rear section defining an opening, the exhaust runner extending through the opening.

2. The snowmobile as set forth in claim 1, wherein the drive assembly comprises a drive belt abutting the terrain, the drive assembly includes a drive shaft journaled by the frame assembly, the transmission assembly includes a transmitter coupling the transfer shaft and the drive shaft, one of the side sections defines a housing of the transmitter.

3. The snowmobile as set forth in claim 2, wherein the housing is separately formed from the side section and is affixed to the side section.

4. The snowmobile as set forth in claim 2, wherein the housing is unitarily formed with the side section.

5. The snowmobile as set forth in claim 1, additionally comprising a steering system, the steering system comprising a ski adapted to the terrain and a steering column linked with the ski, the frame member journals the steering column.

6. A snowmobile comprising a frame assembly, a drive assembly depending from the frame assembly and adapted to abut the terrain so as to propel the frame assembly along the terrain, an internal combustion engine configured to power the drive assembly, the engine including an output shaft, and a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, the frame member supporting the engine in front of the transfer shaft, a body frame, the drive assembly depending from the body frame, the frame member being coupled with a front portion of the body frame, a front frame being disposed forward from the frame member and coupled with the body frame, the front frame defining side sections, each one of the side sections forming a generally upwardly extending portion, and a reinforcement coupling the upwardly extending portions with the front frame.

7. The snowmobile as set forth in claim 6 additionally comprising a steering system, the steering system comprising a ski adapted to abut the terrain and a steering shaft linked with the ski, the reinforcement holding the steering shaft.

8. The snowmobile as set forth in claim 6, wherein the front portion of the body frame defines side sections, the respective side sections of the frame member are affixed to the respective side sections of the body frame.

9. The snowmobile as set forth in claim 7, wherein the steering system additionally comprises a steering column connecting the steering shaft to the ski, the frame member journals the steering column.

10. A snowmobile comprising a frame assembly, a drive assembly depending from the frame assembly and adapted to abut the terrain so as to propel the frame assembly along the terrain, an internal combustion engine configured to power the drive assembly, the engine including an output shaft, and a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, the frame member supporting the engine in front of the transfer shaft, and an engine mount shaft extending transversely between the side sections of the frame member, the mount shaft supports a portion of the engine, the engine having first and second engine bosses spaced apart from each other, one of the side sections having a first mount boss, another one of the side sections having a second mount boss, at least one of the first and the second mount bosses having an adjustment member fitted therein, an end portion of the adjustment member being positioned beyond the first or second mount boss and between the first or second engine boss and the first or second mount boss, positioning of the adjustment member being adjustable relative to the first or second mount boss so that the end portion thereof abuts the first or second engine boss located next to the adjustment member, the engine mount shaft transversely extending through the first and second engine bosses and the first and second mount bosses, each end of the engine mount shaft abutting a surface of the first or second mount boss opposite to the end portion of the adjustment member.

11. The snowmobile as set forth in claim 10, wherein the engine mount shaft includes an elongate bolt, the frame assembly additionally comprises a nut affixing the bolt onto the first and second mount bosses.

12. A snowmobile comprising a frame assembly, a drive assembly depending from the frame assembly and adapted to abut the terrain so as to propel the frame assembly along the terrain, an internal combustion engine configured to power the drive assembly, the engine including an output shaft, and a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, the frame member supporting the engine in front of the transfer shaft, and an engine mount shaft extending transversely between the side sections of the frame member, the mount shaft supports a portion of the engine, the engine having an engine boss, one of the side sections having a mount boss, the mount boss having an adjustment member fitted into the mount boss, an end portion of the adjustment member being positioned beyond the mount boss and between the engine boss and the mount boss, positioning of the adjustment member being adjustable relative to the mount boss so that the end portion thereof abutting the engine boss, the engine mount shaft transversely extending through the engine boss and the mount boss, each end of the engine mount shaft abutting a surface of the mount boss or a surface of the engine boss opposite to the end portion of the adjustment member.

13. A snowmobile comprising a frame assembly, a drive assembly depending from the frame assembly and adapted to abut the terrain so as to propel the frame assembly along the terrain, an internal combustion engine configured to power the drive assembly, the engine including an output shaft, a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, and an exhaust system configured to discharge combustion byproducts of the engine, the exhaust system comprising an exhaust runner, the rear section defining an opening, the exhaust runner extending through the opening.

14. A snowmobile comprising a frame assembly, a drive assembly depending from the frame assembly and adapted to abut the terrain so as to propel the frame assembly along the terrain, an internal combustion engine configured to power the drive assembly, the engine including an output shaft, and a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, a body frame, the drive assembly depending from the body frame, the frame member being coupled with a front portion of the body frame, a front frame being disposed forward from the frame member and coupled with the body frame, the front frame defining side sections, each one of the side sections forming a generally upwardly extending portion, and a reinforcement coupling the upwardly extending portions with the front frame.

15. A snowmobile comprising a frame assembly, a drive assembly depending from the frame assembly and adapted to abut the terrain so as to propel the frame assembly along the terrain, an internal combustion engine configured to power the drive assembly, the engine including an output shaft, and a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, and an engine mount shaft extending transversely between the side sections of the frame member, the mount shaft supports a portion of the engine, the engine having first and second engine bosses spaced apart from each other, one of the side sections having a first mount boss, another one of the side sections having a second mount boss, at least one of the first and the second mount bosses having an adjustment member fitted therein, an end portion of the adjustment member being positioned beyond the first or second mount boss and between the first or second engine boss and the first or second mount boss, positioning of the adjustment member being adjustable relative to the first or second mount boss so that the end portion thereof abuts the first or second engine boss located next to the adjustment member, the engine mount shaft transversely extending through the first and second engine bosses and the first and second mount bosses, each end of the engine mount shaft abutting a surface of the first or second mount boss opposite to the end portion of the adjustment member.

16. A snowmobile comprising a frame assembly, a drive assembly depending from the frame assembly and adapted to abut the terrain so as to propel the frame assembly along the terrain, an internal combustion engine configured to power the drive assembly, the engine including an output shaft, and a transmission assembly configured to transfer power of the engine to the drive assembly, the transmission assembly including a transfer shaft driven by the output shaft, the frame assembly comprising a frame member disposed rearward of the engine, the frame member monolithically defining side sections, a rear section and a bottom section, the transfer shaft transversely extending between the side sections and journaled by the side sections, and an engine mount shaft extending transversely between the side sections of the frame member, the mount shaft supports a portion of the engine, the engine having an engine boss, one of the side sections having a mount boss, the mount boss having an adjustment member fitted into the mount boss, an end portion of the adjustment member being positioned beyond the mount boss and between the engine boss and the mount boss, positioning of the adjustment member being adjustable relative to the mount boss so that the end portion thereof abutting the engine boss, the engine mount shaft transversely extending through the engine boss and the mount boss, each end of the engine mount shaft abutting a surface of the mount boss or a surface of the engine boss opposite to the end portion of the adjustment member.

* * * * *